United States Patent
Ueno et al.

(10) Patent No.: US 7,152,482 B2
(45) Date of Patent: Dec. 26, 2006

(54) PIEZOELECTRIC SENSOR AND INPUT DEVICE INCLUDING SAME

(75) Inventors: Naohiro Ueno, Tosu (JP); Morito Akiyama, Tosu (JP); Hiroshi Tateyama, Tosu (JP)

(73) Assignee: National Institute of Advanced Industrial Science & Technology, Tokyo (JP)

( * ) Notice: Subject to any disclaimer, the term of this patent is extended or adjusted under 35 U.S.C. 154(b) by 11 days.

(21) Appl. No.: 10/529,746

(22) PCT Filed: Sep. 26, 2003

(86) PCT No.: PCT/JP03/12379

§ 371 (c)(1),
(2), (4) Date: Mar. 30, 2005

(87) PCT Pub. No.: WO2004/031711

PCT Pub. Date: Apr. 15, 2004

(65) Prior Publication Data

US 2006/0144154 A1    Jul. 6, 2006

(30) Foreign Application Priority Data

| Oct. 1, 2002 | (JP) | 2002-289197 |
| Nov. 6, 2002 | (JP) | 2002-322301 |
| Dec. 4, 2002 | (JP) | 2002-352567 |

(51) Int. Cl.
*G01L 9/00* (2006.01)

(52) U.S. Cl. .................. 73/723; 73/715; 73/721; 73/727

(58) Field of Classification Search .......... 73/700–756; 361/283.1–283.4
See application file for complete search history.

(56) References Cited

U.S. PATENT DOCUMENTS 4,196,631 A * 4/1980 Deom et al. ............... 73/644

FOREIGN PATENT DOCUMENTS

| EP | 0 511 762 A2 | 11/1992 |
| EP | 0 549 807 A1 | 7/1993 |
| JP | 61023933 A * | 2/1986 |
| JP | 61-66967 U | 5/1986 |
| JP | 5-203665 | 8/1993 |
| JP | 5-242759 | 9/1993 |
| JP | 5-75637 | 10/1993 |
| JP | 5-322670 | 12/1993 |

(Continued)

OTHER PUBLICATIONS

Office Action mailed Jun. 13, 2006 by the PTO for Japanese Patent Application No. 2002-289197.

(Continued)

*Primary Examiner*—Edward Lefkowitz
*Assistant Examiner*—Jermaine Jenkins
(74) *Attorney, Agent, or Firm*—Nixon & Vanderhye P.C.

(57) ABSTRACT

A piezoelectric sensor arranged so as to includes: a transparent piezoelectric element having a piezoelectric property; and a pair of transparent conductor film layers opposed to each other with the piezoelectric element therebetween, the transparent piezoelectric element and the transparent conductor film layers are formed between a pair of transparent substrates, opposed to each other, which serve as pressure transmission means. Consequently, the transparent piezoelectric sensor has an excellent durability. A piezoelectric sensor comprises a piezoelectric element with a piezoelectric property which is made of a piezoelectric material having no Curie point and has a dipole orientation degree of not less than 75%. Consequently, the piezoelectric sensor having an excellent durability and a simple structure is provided at low cost.

13 Claims, 7 Drawing Sheets

FOREIGN PATENT DOCUMENTS

| | | |
|---|---|---|
| JP | 5-324203 | 12/1993 |
| JP | 6-148011 | 5/1994 |
| JP | 10-54773 | 2/1998 |
| JP | 10-122948 | 5/1998 |
| JP | 2754183 | 5/1998 |
| JP | 10-206399 | 8/1998 |
| JP | 11-23384 A | 1/1999 |
| JP | 11-45155 | 2/1999 |
| JP | 11-258262 | 9/1999 |
| JP | 2000-180286 | 6/2000 |
| JP | 2002-182842 | 6/2002 |
| JP | 2002-195904 | 7/2002 |
| JP | 3325751 | 9/2002 |
| JP | 2003-262502 | 9/2003 |

OTHER PUBLICATIONS

Office Action mailed Sep. 5, 2006 by the PTO for Japanese Patent Application No. 2002-289197.

* cited by examiner

PIEZOELECTRIC SENSOR AND INPUT DEVICE INCLUDING SAME

This application is the US national phase of international application PCT/JP2003/012379 filed 26 Sep. 2003 which designated the U.S. and claims benefit of JP's 2002-289197, 2002-322301 and 2002-352567, dated 1 Oct. 2002, 6 Nov. 2002 and 4 Dec. 2002, respectively, the entire content of which is hereby incorporated by reference.

TECHNICAL FIELD

The present invention relates to a piezoelectric sensor and an input device including the same. More particularly, the present invention relates to a piezoelectric sensor for detecting physical quantities such as acoustic emissions, pressure, oscillation, and acceleration in a high-temperature environment such as an inside of an internal combustion engine (or an inside of an internal combustion cylinder) and an inside of a plant such as an atomic power plant, or to a transparent piezoelectric sensor having a piezoelectric element formed between transparent conductor films opposite to each other (transparent electrodes), and to a transparent input device having a plurality of the piezoelectric sensors.

BACKGROUND ART

Conventionally, piezoelectric sensors have been employed in various fields.

As an example, there is a transparent input device using a piezoelectric sensor. Examples of the transparent input device in use are a resistance-film transparent input device (Japanese Laid-Open Publication No. 242759/1993 (Tokukaihei 5-242759; published on Sep. 21, 1993)), a capacitance transparent input device (Japanese Laid-Open Publication No. 324203/1993 (Tokukaihei 5-324203; published on Dec. 7, 1993)), an analog-capacitor transparent input device, an ultrasonic-surface-elastic-wave transparent input device (e.g., Japanese Laid-Open Publication No. 182842/2002 (Tokukai 2002-182842; published on Jun. 28, 2002)), and an infrared-scanning transparent input device (e.g., Japanese Laid-Open Publication No. 45155/1999 (Tokukai 11-45155; published on Feb. 16, 1999)).

The resistance-film transparent input device is constituted of a pair of substrates opposite to each other, i.e., a top sheet (upper substrate) on a surface of an input panel and a lower substrate opposed thereto. Further, an inside of the upper substrate is coated with a transparent conductor film, and an inside of the lower substrate is also coated with a transparent conductor film. The transparent conductor films are opposed to each other at a predetermined distance. That is, the transparent conductor films are out of contact with each other.

Meanwhile, the capacitance transparent input device and the analog-capacitor transparent input device, as with the resistance-film transparent input device, detect a contact position based on such a principle that a capacitance changes when a finger touches an input panel coated with a transparent conductor film layer.

Further, the ultrasonic-surface-elastic-wave transparent input device and the infrared-scanning transparent input device detect a contact position by scanning a surface of a transparent panel with a surface elastic wave and infrared light respectively.

In case of the resistance-film transparent input device, when the top sheet is subjected to outside pressure, the transparent conductor films disposed at a distance from each other are caused to come into contact with each other. The contact position is calculated from a voltage gradient of the transparent conductor films for detection. Therefore, in the resistance-film transparent input device, the top sheet needs to be deformed by being subjected to outside pressure. As a result, the resistance-film transparent input device raises such problems that: the transparent conductor films are flawed by coming into contact with each other, and durability is impaired because the transparent conductor films need to be deformed.

Meanwhile, the capacitance transparent input device and the analog-capacitor transparent input device detect a contact position according to a capacitance change. Therefore, the capacitance transparent input device and the analog-capacitor transparent input device raise such problem that they may malfunction when an electromagnetic noise is generated.

Moreover, the ultrasonic-surface-elastic-wave transparent input device and the infrared-scanning transparent input device raise such problem that they tend to have a complex structure and have difficulty in dealing with simultaneous multipoint contact.

Accordingly, a piezoelectric sensor and a transparent input device have been demanded which have an excellent durability and an anti-noise property.

Further, as an example of other applications of a piezoelectric sensor, there is a piezoelectric sensor which is installed in a high-temperature structure such as a pipe and a valve in a plant (e.g., an atomic power plant) or an internal-combustion engine in order to detect an abnormality in the structure. For example, an acoustic emission sensor and a piezoelectric oscillation sensor have been used. The acoustic emission sensor detects an acoustic emission, i.e., an elastic wave which is generated when the structure is cracked and broken. The piezoelectric oscillation sensor detects an abnormal oscillation and information on acceleration. These sensors come in various types, such as a compression type, a cantilever type, a diaphragm type, and a shear type.

Among them, a compression-type thin-film piezoelectric sensor including: a laminated body having a pedestal with a pedestal-side electrode; a piezoelectric body; a load-body-side electrode; and a load body, wherein these materials are laminated in this order, and the compression-type thin-film piezoelectric sensor is used with a lower surface of the pedestal strongly, i.e., firmly mounted on a target object. When an oscillation occurs in the target object, the oscillation is transmitted to the pedestal side of the sensor. Whereas the pedestal side of the sensor oscillates together with the target object, the load body side oscillates with delay due to inertial force, and the piezoelectric body is subjected to a compressive stress or tensile stress proportional to oscillatory acceleration. Further, a potential or a voltage proportional to the stress is generated on both sides of the piezoelectric body and is extracted (taken out) by the two electrodes (the pedestal-side electrode and the load-body-side electrode). A measurement of the electrical output so extracted makes it possible to detect a size of the oscillation or the acceleration of the target object.

Conventionally, a piezoelectric body made of a piezoelectric material such as lead zirconate titanate and vinylidene polyfluoride, as described in Japanese Laid-Open Publication No. 148011/1994 (Tokukaihei 6-148011; published on May 27, 1994) and Japanese Laid-Open Publication No. 206399/1998 (Tokukaihei 10-206399; published on Aug. 7, 1998), has been used for such a piezoelectric sensor. However, a piezoelectric body made of such a piezoelectric material has a low Curie point (the term "Curie point" means a temperature at which a polarization of such a piezoelectric body disappears.) and therefore has a maximum operating temperature of about 300° C. at the highest. Accordingly, in order to keep a temperature of a piezoelectric body at an applicable temperature, Japanese Laid-Open Publication No. 203665/1993 (Tokukaihei 5-203665; published on Aug. 10, 1993) discloses a piezoelectric body cooled with a peltiert element. However, because the peltiert element only has a function of simply generating a local temperature gradient, a cooling mechanism cannot be mounted on an outside remote from the piezoelectric body, so that the peltiert element cannot be applied to a part where a whole of the piezoelectric body becomes hot.

Therefore, as described above, because the conventional thin-film piezoelectric sensor cannot withstand high temperatures, an oscillation of a target object which reaches a high temperature is brought through an oscillation transmission bar to a remote low-temperature environment for measurement. However, an oscillation such as an acoustic emission is attenuated due to a property of an oscillation transmission substance in the process or is mixed with an external redundant oscillation in the process of transmission, so that the oscillation of the target object cannot be measured sufficiently accurately. That is, for the purpose of an accurate measurement, it is desirable that an oscillation be measured in a place as proximate as possible to the place where the oscillation has occurred.

This is achieved by a thin-film piezoelectric sensor, disclosed in Japanese Laid-Open Publication No. 34230/1993 (Tokukaihei 5-34230; published on Feb. 9, 1993), which withstands high temperatures and whose piezoelectric layer is made of a piezoelectric material such as lithium niobate, which has a high Curie point. Lithium niobate has a Curie point of about 1140° C. and can be used in a high-temperature environment without cooling means. However, lithium niobate is hard to make thinner and needs to be a monocrystalline body to obtain a piezoelectric property, thereby raising such problem that it is difficult to produce and process the sensor at low cost.

A high-temperature thin film oscillation sensor described in Japanese Laid-Open Publication No. 122948/1998 (Tokukaihei 10-122948; published on May 15, 1998), in order to solve these problems, is arranged so that zinc oxide or aluminum nitride is used as a piezoelectric ceramic having no Curie point, and a thin film including the piezoelectric ceramic oriented in a c-axis direction is used as a piezoelectric thin film element.

However, a substance whose crystal has a wurtzite structure (e.g., zinc oxide and aluminum nitride, described in the foregoing patent document) has difficulty in retaining a piezoelectric property, and it is impossible to stably improve a piezoelectric property only by a c-axis orientation of an axis of the crystal. That is, a c-axis orientation is a factor necessary to improve a piezoelectric property but is not sufficient by itself to stably retain a piezoelectric property. Experiment data shows that even when a substance having an excellent piezoelectric property can be produced, the substance is not reproducible. In some cases, a piezoelectric property is not expressed at all.

This is because a piezoelectric sensor produced by the method of the foregoing patent document has a substrate and a piezoelectric layer provided directly thereon and therefore cannot stably align a direction of a dipole of a crystal of a piezoelectric element. Even when a piezoelectric element which has a high dipole orientation degree is produced, it is difficult to obtain a piezoelectric element whose piezoelectric layer has a high dipole orientation degree. Specifically, it is impossible to cause the piezoelectric layer to keep a dipole orientation degree not less than 75%. This prevents the piezoelectric sensor from retaining a piezoelectric property and causes such problem that pressure cannot be detected satisfactorily.

Accordingly, a small, inexpensive thin-film piezoelectric sensor for detecting an acoustic emission and an oscillation or acceleration has been demanded which ensures a piezoelectric property by thinning a piezoelectric material having no Curie point and orienting a polarity of a crystal in the thin film, requires no cooling means, and has an excellent durability.

Moreover, such conditions are required in a cylinder internal-pressure sensor for grasping a phenomenon in a combustion chamber of an internal combustion engine. Conventionally, the cylinder internal-pressure sensor, disposed on an inner surface of a cylinder, transmits internal pressure of the cylinder through a diaphragm and a pressure transmission bar to a piezoelectric element, and extracts from the piezoelectric element an electrical signal proportional to a size of the internal pressure of the cylinder, so that the pressure is detected. The foregoing piezoelectric element is generally a piezoelectric element made of a ceramic material such as lead zirconate titanate and lead titanate.

However, as with an ignition plug, a piezoelectric sensor which directly measures internal pressure of a cylinder is exposed to a high combustion temperature (500° C.), and a piezoelectric element reaches a very high temperature (about 400° C.).

A ceramic piezoelectric element made of lead zirconate titanate has a Curie point of about 250° C.; a ceramic piezoelectric element made of lead titanate has a Curie point of about 350° C. These temperatures are both lower than the foregoing combustion temperature and undesirably allow the piezoelectric elements to reach their respective Curie points. When a piezoelectric material reaches a high temperature exceeding a Curie point, a piezoelectric element exhibits a deterioration in a piezoelectric property due to depolarization and the like and therefore becomes unusable, so that the piezoelectric element is usually used in combination with separate cooling means for keeping a temperature of the piezoelectric element at a suitable temperature.

Meanwhile, an arrangement requiring no cooling means may be achieved by a piezoelectric element disclosed in Japanese Laid-Open Publications No. 34230/1993, as described already, and Japanese Laid-Open Publication No. 180286/2000 (Tokukai 2000-180286; published on Jun. 30, 2000). The piezoelectric element is made of a monocrystalline piezoelectric material (e.g., lithium niobate) which has a relatively high Curie point. Lithium niobate has a Curie point of about 1140° C. Therefore, even when the piezoelectric element reaches a high temperature of about 400° C. in case of measuring internal pressure of a cylinder, the piezoelectric element, having a much higher Curie point, does not deteriorate, thereby requiring no cooling means.

However, lithium niobate, having a low processability, is hard to make thinner and needs to be used in a monocrystalline state. Moreover, because a special method is required to form lithium niobate into an arbitrary shape, lithium niobate is limited in handling and therefore causes a problem with cost.

Further, lithium niobate has a problem with retention of a monocrystal. When a monocrystal of lithium niobate is brought into direct contact with a diaphragm and the diaphragm is subjected to uneven pressure, an electrode, disposed on an opposite side of the diaphragm, which serves to retain the monocrystal, is distorted. In the worst case, a retention part may be damaged. In order to prevent this, a bar-like pressure transmission mechanism for transmitting internal pressure of a cylinder to a piezoelectric element is required. However, this inevitably results in a complex structure.

For example, Japanese Laid-Open Publication No. 34230/1993 discloses a pressure sensor which has a detection element and a diaphragm. The detection element is constituted of a piezoelectric element, a pressure transmission mechanism, and the like, and is stored in an inside of a main metal body mounted in a sensor-mounting screw hole provided in a cylinder block. Also, the diaphragm is press-fitted onto a lower end surface of the main metal body facing a cylinder. However, a pressure transmission bar needs to be provided between the diaphragm and the piezoelectric element.

Further, in Japanese Laid-Open Publication No. 180286/2000, a pressure transmission bar is not used, but a diaphragm is provided with a projection. A piezoelectric element has a load-receiving structure which generates a compressive stress so that a pressure detection element is not deflected (bent) even under a load due to internal pressure of a cylinder from the projection of the diaphragm.

Thus, the conventional piezoelectric materials cause a pressure transmission structure to be complex, large and expensive and therefore cannot satisfy demand.

Accordingly, in view of this, an inexpensive piezoelectric sensor having an excellent durability and a simple structure has been demanded.

The present invention, completed in consideration of the foregoing problems, has a first object to provide a piezoelectric sensor, made of a transparent pressure-sensitive material having a piezoelectric property, which has an excellent durability and an anti-noise property, and a transparent input device including the same.

Further, the present invention has a second object to provide a small, inexpensive piezoelectric sensor, ensuring a piezoelectric property, requiring no cooling means, and having an excellent durability, which detects an acoustic emission and an oscillation or acceleration, or detects internal pressure of a cylinder in order to grasp a phenomenon in a combustion chamber of an internal combustion engine.

DISCLOSURE OF INVENTION

As a result of various studies of a method of forming a transparent thin film made of a transparent electrode with a piezoelectric material thereon, the inventors have found that the foregoing objects can be achieved by depositing a piezoelectric ceramic in a monocrystalline shape to form a thin film, and have completed the present invention based on that knowledge.

That is, the present invention provides a piezoelectric sensor and a transparent input device including a plurality of the piezoelectric sensors, the piezoelectric sensor including an electrode constituted of a transparent conductor film, a transparent piezoelectric ceramic monocrystalline thin film being formed on the electrode, a transparent conductor film being provided on the thin film, an electric circuit being provided in the two conductor layers via detection means.

In order to solve the foregoing problems, the piezoelectric sensor according to the present invention is arranged so as to include: a transparent piezoelectric element having a piezoelectric property; and a pair of transparent conductor film layers opposed to each other with the piezoelectric element therebetween, the transparent piezoelectric element and the transparent conductor film layers being formed between a pair of transparent substrates, opposed to each other, which serve as pressure transmission means.

In other words, the piezoelectric sensor of the present invention is arranged so that a layer made of a piezoelectric element having a piezoelectric property is formed between transparent conductor films in a pair of substrates having the transparent conductor films.

With the foregoing arrangement, when one of the pair the transparent substrates is subjected to outside pressure, the pressure acts on the piezoelectric element having a piezoelectric property through the substrate. As a result, the piezoelectric element takes a charge. The charge is detected by a transparent electrode constituted of a pair of transparent conductor films. That is, the transparent electrode detects the charge generated in the piezoelectric element and outputs the detection signal.

In a conventional resistance-film piezoelectric sensor, there is a space between transparent conductor films, i.e., transparent conductor films are disposed at a predetermined distance from each other. When one of the pair the transparent substrates is subjected to outside pressure, the transparent conductor films are deformed to come into contact with each other, thereby detecting the outside pressure. This has raised problems with a flaw occurring due to contact of the transparent conductor films and with durability of the transparent conductor films.

Conversely, the piezoelectric sensor of the present invention has the pair of transparent conductor films opposed to each other with the piezoelectric element interposed therebetween. When one of the pair of the transparent substrates is subjected to outside pressure, the piezoelectric element takes a charge. The charge is detected by the transparent conductor films, so that the outside pressure is detected. Therefore, the transparent conductor films do not need to come into contact with each other, so that a flaw can be prevented from occurring due to contact. Moreover, the transparent conductor films do not need to be deformed, so that a piezoelectric sensor having an excellent durability as compared with the conventional arrangements can be provided.

It is preferable to arrange the piezoelectric sensor of the present invention so that the piezoelectric element is made of aluminum nitride or zinc oxide.

Among piezoelectric thin films, the piezoelectric thin film made of aluminum nitride or zinc oxide has a relatively high mechanical strength, thereby making it possible to provide a piezoelectric sensor having an excellent durability.

It is preferable to arrange the piezoelectric sensor of the present invention so that the piezoelectric element has a thickness of 1 µm to 10 µm.

When a piezoelectric element is too thin, it is impossible to maintain an insulative property between the transparent conductor films, so that insulation failure tends to occur. Further, when a piezoelectric element is too thick, it takes long time to form the element. However, a piezoelectric element with a thickness of 1 µm to 10 µm can maintain an insulative property between the transparent conductor films and does not take so long time to form the element.

The piezoelectric sensor according to the present invention may be arranged so that a further transparent conductor film layer is formed on one of the pair of transparent substrates so as to be positioned in a side opposite to the transparent conductor film layer.

With the foregoing arrangement, a further transparent conductor film layer is formed on one of the pair of transparent substrates. That is, one of the transparent substrates is interposed between the transparent conductor films.

For example, in case where one of a pair of transparent conductor films opposed to each other with a piezoelectric element therebetween has a zero potential at all times and the other detects a charge generated in the piezoelectric element, when an external unnecessary noise is generated, the noise may be detected by the transparent conductor film which detects the charge. As a result, the piezoelectric sensor may malfunction.

However, the piezoelectric sensor of the present invention is arranged so that a further transparent conductor film layer is formed on the transparent substrate so as to be positioned in a side opposite to the transparent conductor film layer for detecting a charge in the piezoelectric element. Therefore, even when an external noise is generated, the noise is detected by the transparent conductor film layer formed on the opposite side.

Therefore, with the piezoelectric sensor of the present invention, an external noise does not reach the transparent conductor film layer for detecting a charge in the piezoelectric element. This securely prevents an external noise from being detected as a charge in the piezoelectric element, thereby preventing malfunctioning.

In order to solve the foregoing problems, the method according to the present invention for producing the piezoelectric sensor includes the steps of: forming transparent conductor film layers respectively on a pair of transparent substrates; forming a transparent piezoelectric element having a piezoelectric property so as to cover one of the transparent conductor film layers which has been formed on one of the pair of transparent substrates; and bonding the piezoelectric element to the other of the transparent conductor film layers which has been formed on the other transparent substrate not provided with the piezoelectric element.

With the foregoing arrangement, a piezoelectric sensor which has transparent conductor films opposed to each other with a piezoelectric element having a piezoelectric property interposed therebetween is produced. The piezoelectric sensor has a pair of transparent conductor films opposed to each other with a piezoelectric element interposed therebetween. Further, when one of the pair the transparent substrates is subjected to outside pressure, the piezoelectric element takes a charge. The charge is detected by the transparent conductor films, so that the outside pressure is detected.

Therefore, the transparent conductor films do not need to come into contact with each other, so that a piezoelectric sensor can be provided which makes it possible to prevent a flaw form occurring due to contact. Moreover, the transparent conductor films do not need to be deformed, so that a piezoelectric sensor having an excellent durability as compared with the conventional arrangements can be provided.

In order to solve the foregoing problems, an input device according to the present invention is arranged so as to include a plurality of piezoelectric sensors each of which is the aforementioned piezoelectric sensor according to the present invention.

That is, the input device is a transparent input device including a plurality of the piezoelectric sensors of the present invention as a keypad.

As described above, since the piezoelectric sensor of the present invention, unlike the conventional arrangements, is arranged so that the transparent conductor film layers do not come into contact with each other, the piezoelectric sensor makes it possible to prevent a flaw due to contact and has an excellent durability. Therefore, the input device including the piezoelectric sensors of the present invention can be used as an input device having the same effect. Further, outside pressure is detected by the piezoelectric element, so that a position subjected to pressure can be detected with a simple structure.

Further, as a result of various studies, the inventors has completed an inexpensive piezoelectric sensor having a simple structure by depositing a piezoelectric material having no Curie point in a monocrystalline form while controlling a dipole orientation degree of the piezoelectric material so as to form a thin film on a metal diaphragm.

That is, the present invention provides a piezoelectric sensor including a thin metal diaphragm on which a piezoelectric element having no Curie point is deposited in a monocrystalline manner so as to form a thin film, the diaphragm being mounted on an internal-combustion cylinder and press-fitted into an opening end of an axial hollow provided in a main metal body, the axial hollow having a detection opening positioned in the cylinder.

In order to solve the foregoing problems, the piezoelectric sensor of the present invention is a piezoelectric sensor having pressure detection means which includes: pressure transmission means for transmitting pressure; and a piezoelectric element for receiving the pressure so as to convert the pressure into an electrical signal, the pressure being transmitted from the pressure transmission means, the piezoelectric sensor being characterized in that the piezoelectric element is made of a piezoelectric material having no Curie point and has a dipole orientation degree of not less than 75%.

The "piezoelectric material having no Curie point" is a material which has a piezoelectric property and does not lose the piezoelectric property until a crystal of the material is melted or sublimated, i.e., a material whose polarity is not inverted along with a temperature rise. Specifically, a substance having a wurtzite structure is an example. A crystal of the substance having a wurtzite structure has no symmetric property and therefore has a piezoelectric property. Moreover, the substance is different from a ferroelectric substance such as lead zirconate titanate, has no Curie point, and does not lose a piezoelectric property until the crystal is melted or sublimated. Therefore, since a piezoelectric element made of the piezoelectric material has an excellent durability and does not deteriorate in a piezoelectric property even at high temperatures, the piezoelectric element does not lose its function as a piezoelectric element even in case of being exposed to a high temperature of nearly 500° C. as in a cylinder of an engine. This eliminates the need for providing the piezoelectric element with cooling means. Moreover, this eliminates the need for taking a temperature environment into consideration, so that it is no longer necessary to install the piezoelectric element in a low-temperature place, thereby making it possible to simplify a structure. Therefore, a piezoelectric sensor having heat resistance and a simple structure can be provided at low cost.

Further, a "dipole orientation degree" is defined as a percentage at which crystalline columns constituting an electric dipole and having the same polarity (positive or negative) occupy a surface of a thin film. If crystalline columns are oriented in completely random directions, a piezoelectric property of one crystalline column cancels out a piezoelectric property of another crystalline column, so that a thin film as a whole loses a piezoelectric property. That is, when the piezoelectric element has a dipole orientation degree of not more than 75%, an apparent piezoelectric constant becomes not more than one half of that when a dipole orientation degree is 100%, so that a piezoelectric property of the piezoelectric element deteriorates, thereby making it impossible to detect stress and pressure satisfactorily. When the piezoelectric element is formed so as to have a dipole orientation degree of not less than 75%, the foregoing problem does not occur, so that the piezoelectric element retains a piezoelectric property. Therefore, the piezoelectric sensor having heat resistance and a simple structure can retain a good piezoelectric property.

Note that, a material having no Curie point, e.g., a material having a wurtzite structure is different from a ferroelectric substance, and a dipole direction of the material cannot be controlled by an external electric field after a crystal of the material has been formed, so that it is impossible to control a dipole direction of each of the crystalline columns after a thin film of the crystalline column has been formed. Therefore, it is necessary to ensure that the thin film has a good piezoelectric property by controlling a dipole orientation of the crystal when the thin film of the crystal is formed.

Note that, such a piezoelectric element may be applied to the piezoelectric element of the transparent piezoelectric sensor.

Further, in order to solve the foregoing problem, the piezoelectric sensor of the present invention, in addition to the foregoing arrangement, is arranged so that the piezoelectric element is made of aluminum nitride (AlN) or zinc oxide (ZnO).

Since AlN and ZnO are substances each having a wurtzite structure, and a crystal of AlN and a crystal of ZnO have no symmetric property, AlN and ZnO naturally have a piezoelectric property. Moreover, unlike a ferroelectric substance, AlN and ZnO have no Curie point and are not inverted in polarity even at high temperatures, so that they do not lose a piezoelectric property until the crystals are melted or sublimated.

For example, AlN has a sublimation temperature of 2000° C., so that AlN does not lose a piezoelectric property until 2000° C. Since a combustion temperature inside an engine cylinder is about 500° C., a piezoelectric element made of AlN does not need to be provided with cooling means to retain a piezoelectric property. Therefore, the piezoelectric element made of the piezoelectric material has an excellent heat resistance, and a piezoelectric property of the piezoelectric element does not deteriorate. Further, the piezoelectric element has an excellent processabilty and is suitable for lamination.

Such a piezoelectric element having heat resistance does not need to be provided with cooling means and does not need to be installed in a low-temperature place, so that a piezoelectric sensor having a simple structure and heat resistance can be provided at low cost.

Further, in order to solve the foregoing problems, the piezoelectric sensor of the present invention, in addition to the foregoing arrangement, is arranged so that the piezoelectric element is formed by physical vapor deposition process.

The "physical vapor deposition process" is a process in which a substance is evaporated by a physical process and concentrated on a film material so as to form a thin film. Examples are a sputtering process and a vacuum deposition process. With this method, a needle-shaped crystal of the piezoelectric material grows to a frost column crystal, so that a monocrystalline thin film of the piezoelectric material can be formed.

Note that, when the crystalline column is subjected to a stress, both ends of the crystalline column respectively take positive and negative charges to form an electric dipole, and it depends on a direction of the dipole of the crystalline column which ends takes the positive charge. Therefore, in order to increase a dipole orientation degree and ensure that a thin film of a piezoelectric element has a good piezoelectric property, it is necessary to control a dipole orientation of a crystal when a thin film of the crystal is formed. For example, it is necessary to arrange a c-axis orientation of the crystal by setting an optimum substrate temperature, an optimum distance between substrate targets, and an optimum gas pressure when a piezoelectric element is formed by a physical vapor deposition.

Further, in order to solve the foregoing problems, the piezoelectric sensor of the present invention, in addition to the foregoing arrangement, is arranged so that the piezoelectric element has a thickness of 0.1 μm or more to 100 μm or less.

This is because the piezoelectric element with a thickness of less than 0.1 μm makes it difficult to serially form films and tends to short-circuit electrodes when one of the electrodes is disposed on top of the other, and the piezoelectric element with a thickness of more than 100 μm takes long time to form. Therefore, when the piezoelectric element having a thickness within the limits makes it possible to produce in a short period of time a piezoelectric sensor which can detect stress and pressure satisfactorily.

Further, in order to solve the foregoing problems, the piezoelectric sensor of the present invention, in addition to the foregoing arrangement, is arranged so that the pressure transmission means is constituted of a metal diaphragm, and the pressure detection means is formed by providing a piezoelectric element on a surface of the metal diaphragm.

Here, a "diaphragm" means a film-like body which is deformed in response to pressure. Further, the phrase that "the metal diaphragm and a piezoelectric element formed on a surface thereof" means not only that the piezoelectric element is formed directly on the diaphragm, but also that the piezoelectric element is formed on the diaphragm with a base layer or an electrode layer, which smoothes a surface of the diaphragm interposed therebetween.

With the foregoing arrangement, the pressure detection means is made of a thin metal diaphragm and the metal diaphragm has a piezoelectric element on a surface thereof, thereby providing thin pressure detection means having a simple structure. Further, a complex structure such as a pressure transmission bar is omitted. Moreover, the metal diaphragm used in case of this arrangement is different from the conventional arrangements, is used only for transmitting pressure to the piezoelectric element, and is subjected not to a deflective strain but to a compressive strain. Therefore, the metal diaphragm is strained only slightly due to the pressure, and the piezoelectric element formed thereon is also only slightly strained, thereby eliminating the need for a structure for preventing the piezoelectric element from being damaged due to an excessive strain. This makes it possible to simplify a structure of the piezoelectric element.

Note that, a thin ceramic sintered body is used for the pressure detection means; however, since such a thin ceramic sintered body is poor at withstanding a physical shock and a heat shock, it is preferable to use a metal.

Further, in order to solve the foregoing problems, the piezoelectric sensor of the present invention, in addition to the foregoing arrangement, is arranged so as to include a main metal body for mounting the pressure detection means on an internal-combustion cylinder, the main metal body having an axial hollow for connecting an inside of the cylinder with an outside of the cylinder, the pressure detection means being provided in the axial hollow.

The piezoelectric sensor of the present invention has an excellent heat resistance and can be more effectively used particularly for measuring internal pressure of an internal-combustion cylinder. An internal-combustion engine has a combustion temperature of about 500° C., and a piezoelectric element exposed in the internal-combustion engine reaches a temperature of about 400° C. Accordingly, a complex arrangement was needed in which the piezoelectric element was cooled or was installed in a low-temperature place remote from the internal-combustion engine. However, the piezoelectric sensor of the present invention eliminates the need for taking a temperature environment into consideration and therefore achieves a simple structure.

Further, as a result of various studies of a method of forming a thin film of a piezoelectric material having no Curie point, the inventors have found that the foregoing objects can be achieved by depositing a piezoelectric ceramic in a monocrystalline manner while controlling a polarity of the piezoelectric ceramic so as to form a thin film on an insulative substrate (made of an oxide, carbide, nitride, or boride ceramic sintered body or quartz glass) or a conductive substrate (made of a heat-resistant metal material equivalent to Inconel or SUS630).

That is, a thin-film piezoelectric sensor according to the present invention is a high-temperature thin-film piezoelectric sensor including an insulative substrate (made of an oxide, carbide, nitride, or boride sintered body or quartz glass) or a conductive substrate (made of a heat-resistant metal material equivalent to Inconel or SUS630) on which a piezoelectric ceramic having no Curie point is deposited in a monocrystalline manner so as to form a thin film. The high-temperature thin-film piezoelectric sensor can be used for various types of thin-film piezoelectric sensor such as a compression type, a cantilever type, a diaphragm type, and a shear type.

The piezoelectric sensor of the present invention is arranged so that the pressure transmission means is a substrate, and a first conductor film layer, the piezoelectric element, and a second conductor film layer are laminated on a surface of the pressure transmission means in this order.

The thin-film piezoelectric sensor of the present invention has the substrate on which the first conductor film layer, the piezoelectric element, and the second conductor film layer are laminated and integrated, so that the thin-film piezoelectric sensor has a simple, small structure. Further, the first conductor film layer functions as a base layer for improving a dipole orientation degree of the piezoelectric element, thereby improving a piezoelectric property.

Further, in order to solve the foregoing problems, the thin-film piezoelectric sensor of the present invention, in addition to the foregoing arrangement, is arranged so that the substrate is an insulative substrate made of an oxide, carbide, nitride, or boride ceramic sintered body or quartz glass. With this arrangement, the ceramic material has an excellent heat resistance, can be produced easily at low cost, has high hardness, and has an accurate property, so that a high-performance thin-film piezoelectric sensor having high productivity can be obtained.

Further, the substrate may be a conductive substrate made of a heat-resistant metal material. With this arrangement, the substrate can be used as a substitute for a lead wire for extracting a signal from the first conductor film layer, and the substrate can be formed into various shapes by normal machining.

Further, in order to solve the foregoing problems, the piezoelectric sensor of the present invention is arranged so that the first conductor film layer has a surface, being in contact with the piezoelectric sensor, which is coated with a metal contained in the piezoelectric sensor.

Here, the "metal contained in the piezoelectric sensor" is a metal serving as a principal component contained in a material for the piezoelectric element, e.g., aluminum when the piezoelectric element is made of aluminum nitride, and zinc when the piezoelectric element is made of zinc oxide. Further, only a surface of the first conductor film layer in contact with the piezoelectric element may be coated with a metal contained in the piezoelectric element, but a whole of the first conductor film layer may be made of a metal contained in the piezoelectric element. That is, for example, when a material for the piezoelectric element is aluminum nitride, a material for the first conductor film layer may be aluminum; when a material for the piezoelectric element is zinc oxide, a material for the first conductor film layer may be zinc.

This causes a dipole orientation degree of the piezoelectric element to rise to 75% and enables the piezoelectric element to retain a piezoelectric property, so that the thin-film piezoelectric sensor can detect stress satisfactorily.

Further, in order to solve the foregoing problems, the piezoelectric sensor of the present invention, in addition to the foregoing arrangement, is arranged so that the second conductor film layer is divided into two or more.

With this arrangement, when different positions in the thin-film piezoelectric sensor are subjected to different stresses or pressures, different stresses are generated by different electrodes, so that different charges and voltages are generated on the different electrodes. In case of a cantilever-type and diaphragm-type piezoelectric sensor, there is a situation where it is effective in terms of sensitivity to detect a stress difference in the substrate provided with a piezoelectric thin film (i.e., a difference between the electrodes). Particularly, in case of detecting a shear stress, not a bending stress, in the cantilever-type piezoelectric sensor, it becomes possible to detect a difference with a hardware device, thereby achieving high-sensitivity detection without restrictions placed on a dynamic range of an amplifier.

For a fuller understanding of the nature and advantages of the invention, reference should be made to the ensuing detailed description taken in conjunction with the accompanying drawings.

BEST MODE FOR CARRYING OUT THE INVENTION

[First Embodiment]

One embodiment of the present invention is described below with reference to FIGS. 1 to 4. Note that, this is not for limitation of the present invention.

A piezoelectric sensor according to the present invention is arranged so that a laminated electrode constituted of transparent conductor film layers opposite to each other and a transparent pressure-sensitive layer (piezoelectric element) having a piezoelectric property interposed therebetween are laminated and integrated on a pair of transparent substrates opposite to each other. As a whole, the piezoelectric sensor is a transparent piezoelectric sensor.

First, an arrangement of the piezoelectric sensor according to the present embodiment will be described.

Figure 1:
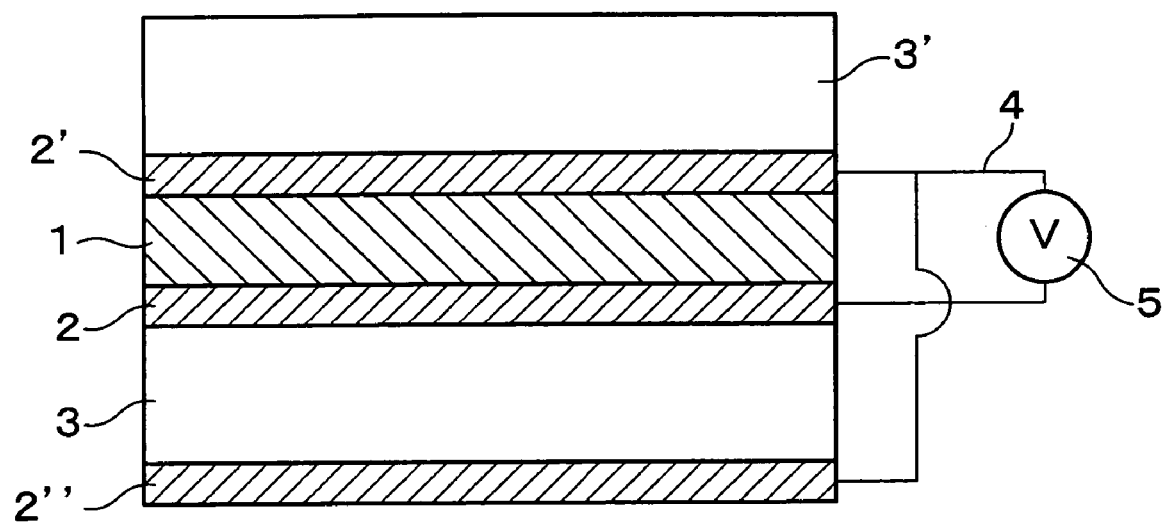
FIG. 1 is a cross-sectional view of a piezoelectric sensor according to one embodiment of the present invention.

FIG. 1 is a cross-sectional view illustrating a structure of the piezoelectric sensor according to the present embodiment. As illustrated in FIG. 1, the piezoelectric sensor of the present embodiment is constituted of: a transparent pressure-sensitive layer 1; transparent conductor film layers 2, 2', and 2"; transparent insulative substrates 3 and 3'; an electric circuit 4; and detection means 5.

The transparent pressure-sensitive layer 1 is made of a piezoelectric material whose surface is charged by pressure. A material (piezoelectric material) for the transparent pressure-sensitive layer 1 is not particularly limited provided that it has a piezoelectric property and can insulate the transparent conductor film layers 2 and 2' from each other. Examples are a piezoelectric crystalline material such as crystal, $LiNbO_3$, $LiTaO_3$; a $PbZrO_3$-$PbTiO_3$ material generated out of a solid solution of $PbZrO_3$ and $PbTiO_3$ (i.e., a piezoelectric ceramic material such as a PZT material); a piezoelectric thin film material such as aluminum nitride and zinc oxide; and a polymeric piezoelectric material such as vinylidene polyfluoride and vinyl polyfluoride. Among them, the piezoelectric thin film material is preferable; that is, aluminum nitride and zinc oxide are more preferable. Aluminum nitride and zinc oxide have a relatively high mechanical strength and therefore are particularly suitable for the transparent pressure-sensitive layer 1.

A thickness of the transparent pressure-sensitive layer 1 is not particularly limited provided that the transparent pressure-sensitive layer 1 can insulate the transparent conductor film layers 2 and 2' to be described later from each other, and can be suitably changed if necessary. However, it is preferable that when made of aluminum nitride or zinc oxide, the transparent pressure-sensitive layer 1 have a thickness of 1 μm to 10 μm. This is because the transparent pressure-sensitive layer 1 with a thickness of less than 1 μm may cause an insulation failure, and the transparent pressure-sensitive layer 1 with a thickness of more than 10 μm takes longer time to form.

The transparent conductor film layers 2 and 2' detect a charge generated by pressurizing the transparent pressure-sensitive layer 1. Further, the transparent conductor film layer 2", as described later, prevents an external noise from being detected.

A material for the transparent conductor film layers 2, 2', and 2" is not particularly limited, but is for example a metal such as platinum (Pt), chrome (Cr), gold (Au), cupper (Cu), silver (Ag), aluminum (Al), and tantalum (Ta) as well as an alloy such as silver-nickel (Ag—Ni).

Further, the transparent conductor film layers 2, 2', and 2" do not need to be made of the same material, but can be made of different materials in accordance with their compatibilities with the transparent pressure-sensitive layer 1 and applications thereof.

A material for the transparent substrates 3 and 3' is for example an inorganic material (e.g., glass) and a resin film (e.g., polyimide, polyethylene terephthalate, polycarbonate, and polyphenylene sulfide). Note that, the transparent substrates 3 and 3' do not need to be made of the same material, but can be made of different materials in accordance with their compatibilities with the transparent conductor film layers 2 and 2' and applications thereof.

Thus, the piezoelectric sensor of the present embodiment is arranged so that: (i) the transparent pressure-sensitive layer 1 having a piezoelectric property and (ii) the pair of transparent conductor film layers 2 and 2' opposite to each other with the transparent pressure-sensitive layer 1 interposed therebetween are provided between the pair of transparent insulative substrates 3 and 3' opposite to each other, and the transparent conductor film layer 2" is provided on the transparent insulative substrate 3 so as to be positioned in a side opposite to the transparent conductor film layer 2. Note that, it may be so arranged that the piezoelectric sensor of FIG. 1 is not provided with a transparent conductor film layer 2". However, in order to securely prevent an external unnecessary noise from interfering, it is preferable that the transparent conductor film layer 2" be provided.

Further, the piezoelectric sensor of FIG. 1 is arranged so that the transparent conductor film layers 2 and 2' are electrically connected by the electric circuit 4 and connected through the electric circuit 4 to the detection means 5. Further, the transparent conductor film layers 2' and 2" maintain a constant potential, i.e., a zero potential at all times. Further, the transparent conductor film layer 2 is connected through the electric circuit 4 to the detection means 5 and detects a charge generated in the transparent pressure-sensitive layer 1.

The detection means 5 is for example a display device (e.g., a voltmeter using a charge sensitive amplifier and a voltage amplifier) and a device for taking in an output voltage of those amplifiers through an A/D (audio-to-digital) converter into a computer.

In the following, operation of the piezoelectric sensor of FIG. 1 under pressure will be described. Note that, in the following description, outside pressure is applied from the side of the transparent insulative substrate 3'.

When the transparent insulative substrate 3' is pressed by an object, the transparent insulative substrate 3' applies pressure to the piezoelectric sensor of FIG. 1 according to the foregoing arrangement. The pressure causes the transparent pressure-sensitive layer 1 serving as a piezoelectric body to take a charge. As a result, the transparent conductor film layer 2 takes the same potential as that of the charge generated in the transparent pressure-sensitive layer 1. Further, the transparent conductor film layers 2' and 2" maintain a zero potential at all times regardless of whether the transparent pressure-sensitive layer 1 takes a charge or not. That is, there occurs a potential difference between the transparent conductor film layer 2 and the transparent conductor film layers 2' and 2" electrically connected to each other by a conductor. The potential difference is detected by the detection means 5 connected through the electric circuit 4.

Further, the piezoelectric sensor of FIG. 1 is provided with the transparent conductor film layer 2". Therefore, even when an external unnecessary noise is generated, the noise is shielded by the transparent conductor film layers 2' and 2". That is, the transparent conductor film layer 2 is shielded from an outside by the transparent conductor film layer 2". This makes it possible to detect only a charge generated in the transparent pressure-sensitive layer 1 without detecting an external noise.

Thus, the piezoelectric sensor of the present embodiment is arranged so that: when the transparent insulative substrate 3' is subjected to outside pressure, the transparent pressure-sensitive layer 1 takes a charge, and the transparent conductor film layer 2 detects the charge. Therefore, the transparent conductor film layers 2 and 2" do not need to come into contact with each other. This prevents a flaw from occurring due to contact. Moreover, the transparent conductor film layers 2 and 2" do not need to be deformed, thereby ensuring an excellent durability as compared with the conventional arrangements. Further, the piezoelectric sensor is provided with the transparent conductor film layer 2", thereby securely preventing an external unnecessary noise from interfering.

The piezoelectric sensor illustrated in FIG. 1 can be produced for example by the following steps (1) to (3) of:

(1) forming the transparent conductor film layers 2 and 2' respectively on the transparent insulative substrates 3 and 3';

(2) forming the transparent pressure-sensitive layer 1 so as to cover the transparent conductor film layer 2 formed on one (e.g., the transparent insulative substrate 3) of the transparent insulative substrates 3 and 3'; and (3) bonding the transparent pressure-sensitive layer 1 to the transparent conductor film layer 2' formed on the transparent insulative substrate 3' so as to be positioned in a side opposite to the transparent pressure-sensitive layer 1 formed in step (2).

Step (1) may further includes the step of forming the transparent conductor film layer 2" in order to securely prevent an external unnecessary noise from interfering.

Further, in step (1), the transparent conductor film layers 2, 2', and 2" can be formed by any one of the publicly known processes such as a printing process, a thin film treatment process, a sputtering process, an evaporation process, an ion plating process, and a bonding process, and a forming process thereof is not particularly limited.

The transparent pressure-sensitive layer 1 formed in the step (2) can be formed by any one of the publicly known processes such as a sputtering process, the ion plating process, a CVD (chemical vapor deposition) process, and a PVD (physical vapor deposition) process, and a forming process thereof is not particularly limited.

As described in an example below, the bonding in step (3) is carried out for example with a cyanoacrylate-based binder, but a bonding process is not particularly limited.

Thus, a piezoelectric sensor having an excellent durability and an anti-noise property as compared with the conventional arrangements can be produced in the simple steps (1) to (3). Note that, an input device to be described later having a plurality of the piezoelectric sensors of the present invention can be produced in the same steps.

In the following, one example of applications of the piezoelectric sensor of the present invention will be described. Whereas one piezoelectric sensor of the present invention described above functions as a touch key, a plurality of the piezoelectric sensors can be used as a keypad (input device).

Figure 2:
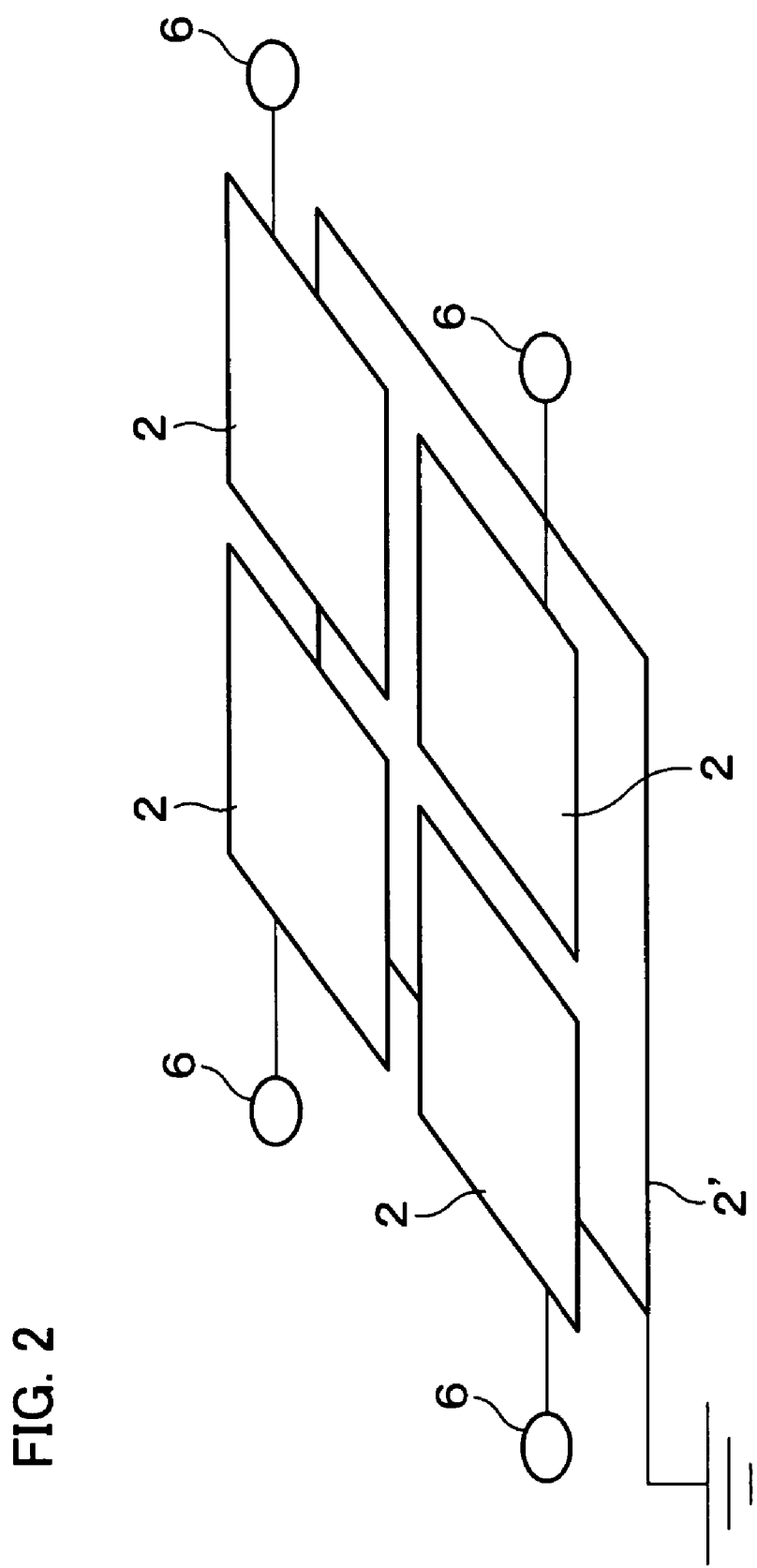
FIG. 2 is a perspective view of a transparent input device using the piezoelectric sensor according to one embodiment of the present invention.

FIG. 2 illustrates a back side (a side of a substrate which side is opposite to the side subjected to outside pressure) of one example of the embodiment. That is, FIG. 2 illustrates the piezoelectric sensor of FIG. 1 seen from the side of the transparent insulative substrate 3. Note that, in FIG. 2, explanations of the transparent pressure-sensitive layer 1, the transparent conductor film layer 2", and the transparent substrates 3 and 3' are omitted. Further, in the following, a surface (panel surface) side (the side of the transparent insulative substrate 3' in FIG. 1) which is subjected to outside pressure is called an "upper part", and an opposite side thereof is called a "lower part". Further, based on this, the transparent conductor film layers 2, 2', and 2" are respectively called an upper transparent conductor film layer 2', an intermediate transparent conductor film layer 2, and a lower transparent conductor film layer 2" in an order from top to bottom.

A touch panel illustrated in FIG. 2 is formed as follows. First, a lower transparent conductor film layer 2" is formed on an entire surface of a lower transparent insulative substrate 3. Next, an intermediate transparent conductor film layer 2 is formed on the lower transparent insulative substrate 3 so as to be positioned in a side opposite to the lower transparent conductor film layer 2". Then, a transparent pressure-sensitive layer 1, an upper transparent conductor film later 2', and the upper transparent insulative substrate 3' are formed entirely on an upper surface of the intermediate transparent conductor film layer 2 in this order. The upper transparent conductor film layer 2' and the lower transparent conductor film layer 2" are electrically connected by a conductive body such as a lead wire and maintain a zero potential at all times. The intermediate transparent conductor film layer 2 is divided into as many keys as needed for a keypad. Each of the intermediate transparent conductor film layers 2 so divided is provided with an output terminal 6 for external connection. Note that, the upper transparent insulative substrate 3' may be divided for the keys or may be integrated as a single insulative substrate. When the upper transparent insulative substrate 3' is integrated, a cross talk may occur. However, since each of the keys has a different output due to a pressure distribution of the key being pressed, it is possible to distinguish an output of the key according to an output value and delay time.

Figure 3:
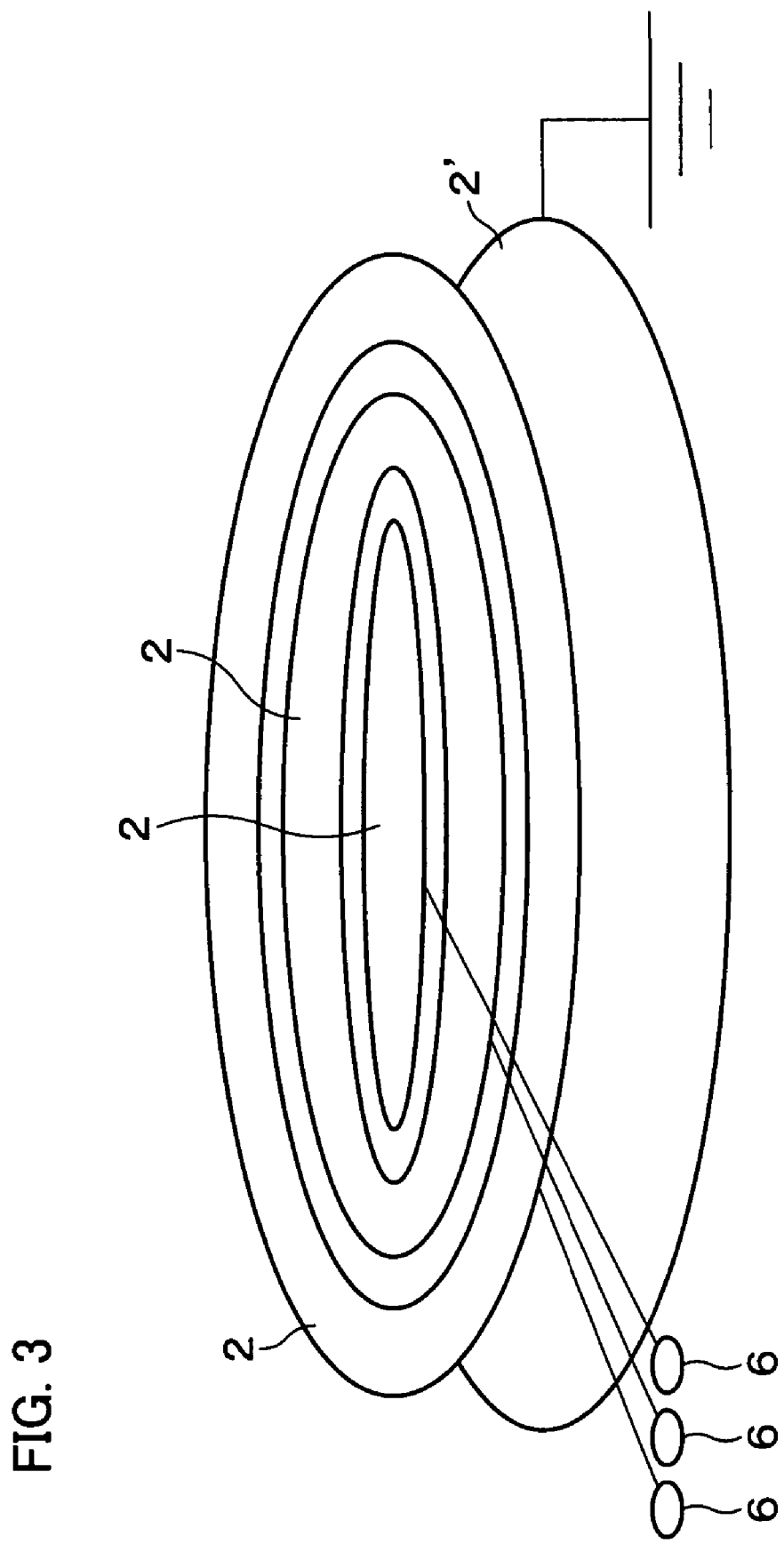
FIG. 3 is a perspective view of a transparent input device having concentric transparent conductor film layers using the piezoelectric sensor according to one embodiment of the present invention.

Note that, the intermediate transparent conductor film layer 2 may take the shape of a matrix as illustrated in FIG. 2 or a concentric circle as illustrated in FIG. 3. When the intermediate transparent conductor film layer 2 takes the shape of a matrix, the intermediate transparent conductor film layer 2 can be used as a normal keyboard. On the other hand, when the intermediate transparent conductor film layer 2 takes the shape of a concentric circle, it is possible to easily obtain contact information in accordance with a distance from the center of a round panel. Therefore, for example, when the intermediate transparent conductor film layer 2 is used for a batter head of an electric drum, it becomes possible to identify a location in contact with a stick, thereby making it possible to change a voice of a generated sound.

Such an input device of the present invention is provided with a piezoelectric sensor of the present invention and therefore, unlike the conventional arrangements, prevents transparent conductor film layers from coming into contact with each other. This makes it possible to prevent a flaw due to contact of transparent conductor film layers with each other. Further, since the transparent conductor films do not need to be deformed, the input device has an excellent durability.

Note that, the piezoelectric sensor of the present invention may be as a whole a transparent piezoelectric sensor in which a pair of transparent conductor film layers opposite to each other and a pressure-sensitive layer having a piezoelectric property interposed therebetween are laminated and integrated onto a transparent substrate.

With this arrangement, the transparent conductor films do not need to come into contact with each other, so that it is possible to prevent a flaw from occurring due to contact. Moreover, the transparent conductor films do not need to be deformed, so that a piezoelectric sensor having an excellent durability as compared with the conventional arrangements can be provided.

Further, the piezoelectric sensor of the present invention may be arranged so that: transparent conductor film layers are formed on both ends of a transparent pressure-sensitive layer having a piezoelectric property, and they are formed between a pair of transparent substrates. That is, the pair of transparent substrates may be in contact with (i) the transparent pressure-sensitive layer and (ii) the transparent conductor films formed on both ends of the transparent pressure-sensitive layer.

Further, the piezoelectric sensor of the present invention may be a piezoelectric sensor including a pair of substrates opposite to each other respectively provided with transparent conductor film layers, wherein a transparent pressure-sensitive layer is formed between the transparent conductor film layers.

With this arrangement, when one of the pair of the transparent substrates is subjected to pressure, the pressure acts on the transparent pressure-sensitive layer, thereby causing the transparent pressure-sensitive layer to take a charge. The charge is detected by the transparent conductor film layers provided on both ends of the transparent pressure-sensitive layer, so that outside pressure can be detected. Therefore, the transparent conductor film layers do not need to come into contact with each other. This makes it possible to prevent a flaw from occurring due to contact. Moreover, the transparent conductor films do not need to be deformed, so that a piezoelectric sensor having an excellent durability as compared with the conventional arrangements can be provided.

A method according to the present invention for producing the piezoelectric sensor may include the step of forming a pressure-sensitive layer having a piezoelectric property on a pair of substrates provided with transparent conductor film layers so that the transparent conductor films are adjacent to each other with the pressure-sensitive layer interposed therebetween.

With the foregoing arrangement, a piezoelectric sensor having a pair of transparent conductor films opposite to each other with a transparent pressure-sensitive layer having a piezoelectric property interposed therebetween can be provided. In other words, a piezoelectric sensor having a pair of transparent conductor films opposite to each other with a pressure-sensitive layer interposed therebetween is produced. The piezoelectric sensor is arranged so that the transparent conductor film layers do not need to come into contact with each other, so that it is possible to prevent a flaw from occurring due to contact. Moreover, the transparent conductor film layers do not need to be deformed, so that a piezoelectric sensor having an excellent durability as compared with the conventional arrangements can be provided.

Example 1

An example of the piezoelectric sensor according to the First Embodiment will be described below.

A glass substrate with ITO (i.e., a glass substrate whose one surface is coated with ITO) was used as a transparent substrate and a transparent conductor film layer. The glass substrate with ITO had a thickness of 1 mm. Next, a thin film of aluminum nitride with a thickness of 1 µm serving as a transparent pressure-sensitive layer was formed on ITO of the glass substrate with ITO by a sputtering process.

Then, another glass substrate with ITO was prepared, and its ITO layer was bonded to the transparent pressure-sensitive layer of aluminum nitride with a cyanoacrylate-based binder.

That is, the piezoelectric sensor of the present invention was made of a glass substrate (transparent insulative substrate layer), ITO (a transparent conductor film layer), aluminum nitride (a piezoelectric element), ITO (a transparent conductor film layer), a glass substrate (transparent insulative substrate layer), that were laminated as layers in this order.

Here, a part serving as a transparent sensor having transparent electrodes opposite to each other (i.e., three layers made of a pair of ITO layers and aluminum nitride interposed therebetween) was 15 mm both in length and width.

Figure 5:
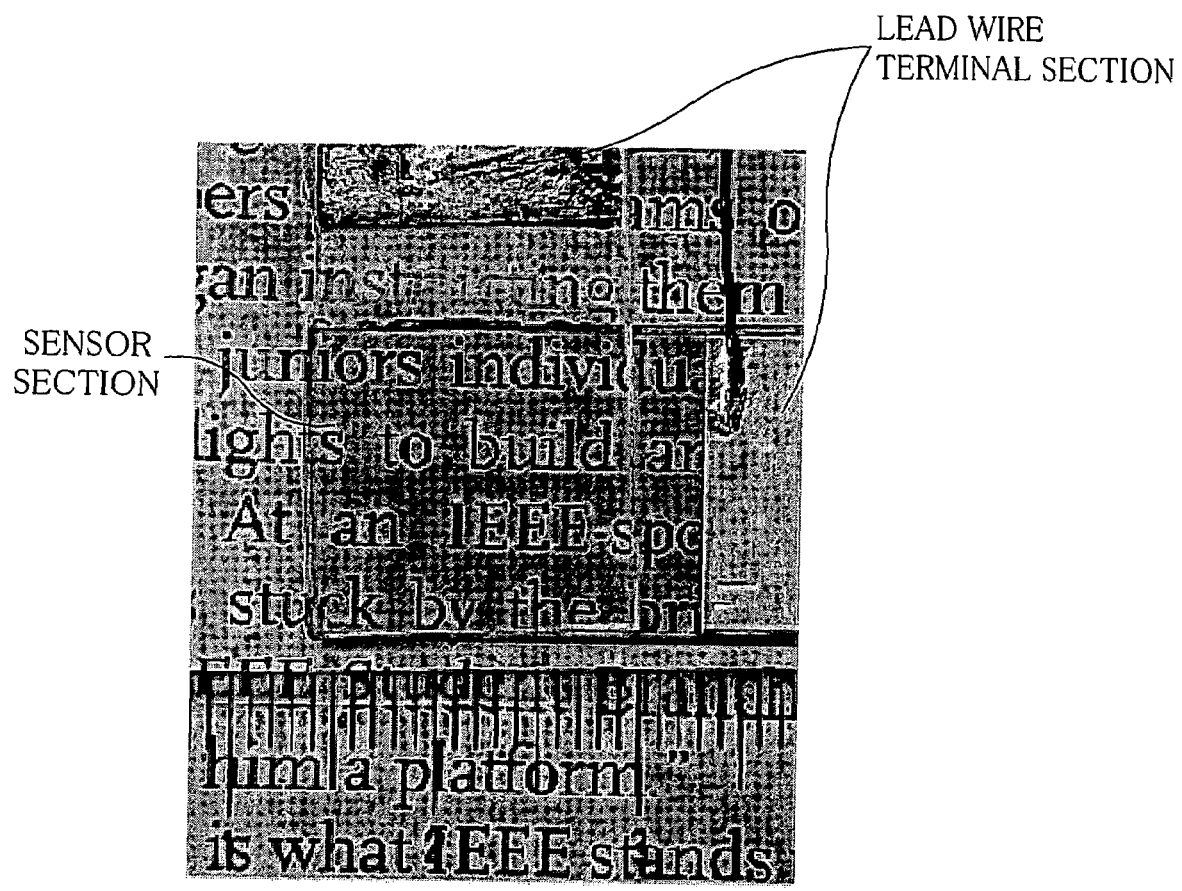
FIG. 5 is a diagram illustrating the piezoelectric sensor of Example 1.

Further, each of the ITO layers (transparent conductor film layers) was provided with a lead wire and connected through a charge sensitive amplifier to a synchroscope, thereby producing a piezoelectric sensor. FIG. 5 shows the piezoelectric sensor so produced which is placed on a sheet. As shown in FIG. 5, characters on the sheet are seen through a sensor section of the piezoelectric sensor so produced. That is, the piezoelectric sensor is undoubtedly transparent.

Figure 4:
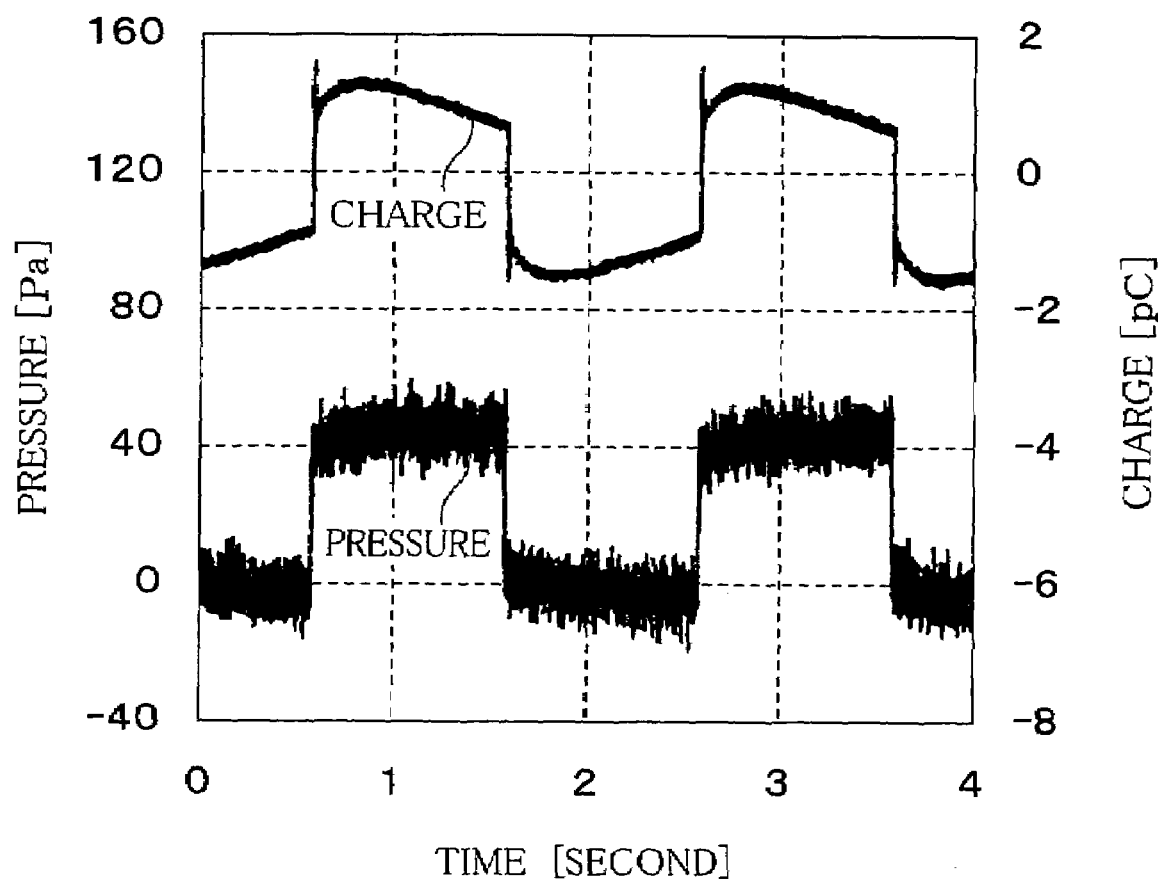
FIG. 4 is a response curve graph of a piezoelectric sensor of Example 1.

A rectangular pressure with a frequency of 1 Hz was applied to the piezoelectric sensor with an electric pressurizer to see a response of the sensor. As a result, as shown in FIG. 4, a charge which was generated when a pressure of about 40 Pa was applied to the piezoelectric sensor was different from a charge which was generated when pressure was released.

[Second Embodiment]

One embodiment of the present invention will be described below with reference to FIGS. 6 and 7.

A metal diaphragm (pressure transmission means) having the piezoelectric thin film layer (piezoelectric element) is press-fitted into an opening end of a hole, leading into an internal-combustion cylinder, of a main metal body, and constitutes a piezoelectric sensor for detecting a phenomenon in the cylinder.

Figure 6:
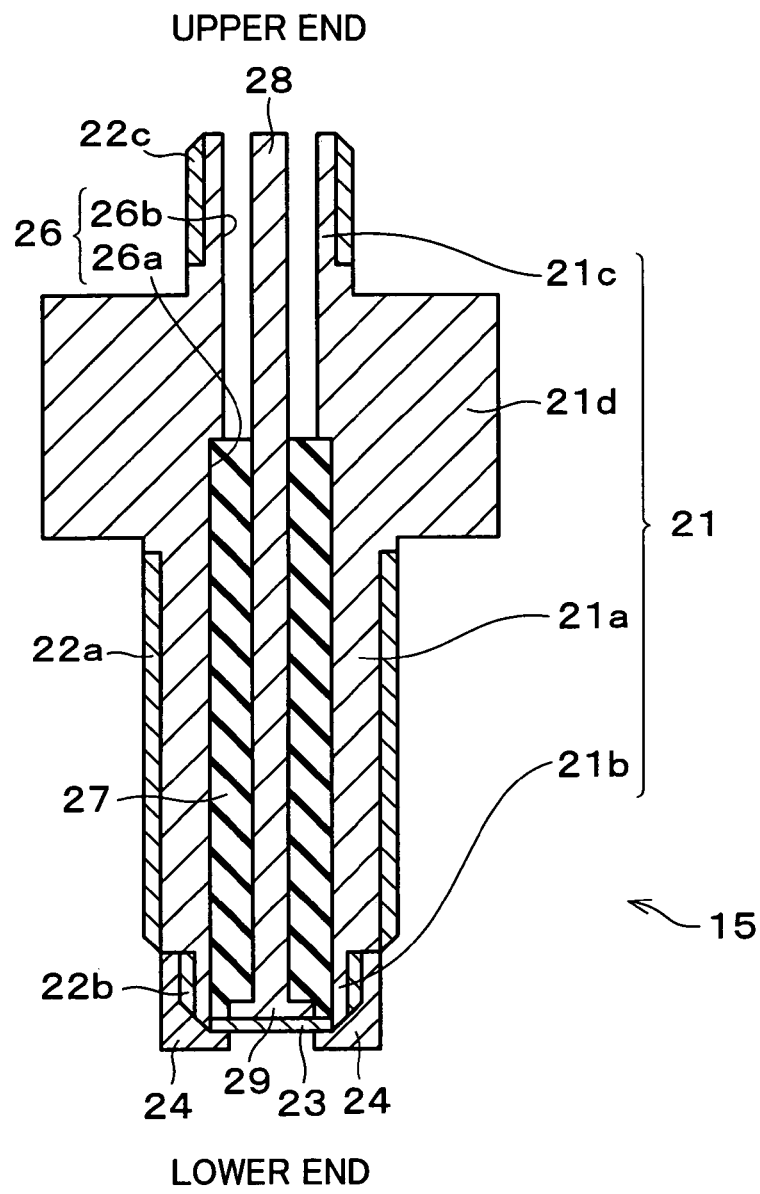
FIG. 6 is a longitudinal sectional view of the piezoelectric sensor according to one embodiment of the present invention.

FIG. 6 is a longitudinal sectional view of the piezoelectric sensor of the present embodiment for measuring internal pressure of an internal-combustion cylinder.

The piezoelectric sensor, constituted of a signal transmission section 15, pressure detection means 23, and a cap 24, detects pressure exerted from a space on the pressure detection means 23 side so as to output an electrical signal.

The pressure detection means 23, provided at a detection opening, receives pressure and converts the pressure into an electrical signal. The pressure detection means 23 will be described in detail later.

The signal transmission section 15, constituted of a main metal body 21, a signal output bar 28, and an electrically insulative column 27, transmits to a signal transportation cable an electrical signal outputted by the pressure detection means 23.

The main metal body 21 has a bolt structure, is constituted of an upper-end portion 21c, an upper portion 21d, a lower portion 21a, and a lower-end portion 21b, and is provided with an axial hollow 26 passing from an upper end through a lower end in an inside thereof.

The upper-end portion 21c, having an upper-end male screw 22c in a perimeter thereof, can be screwed to the signal transportation cable (not shown). The upper portion 21d, having a larger diameter than any other portion, has a corner in a perimeter thereof. The upper portion 21d plays a role as a hexagonal part which fits in a tightening tool such as a wrench in case of screwing the main metal body 21 to another member. The lower portion 21a, having a lower-end male screw 22a in a perimeter thereof, can be screwed to a cylinder block of a cylinder for measuring pressure. The lower-end portion 21b has a lower-end male screw 22b in a perimeter thereof. The lower-end male screw 22b can screw a cap 24 for confining the pressure detection means 23 in a lower end of the main metal body 21.

The axial hollow 26 is an articulated hollow constituted of a large-diameter hollow 26a on the lower-end portion side and a small-diameter hollow 26b on the upper-end portion side. The electrically insulative column 27 is inserted into the large-diameter hollow 26a. The signal output bar 28, in parallel to the axial hollow 26, is provided so as to pass through the center of the electrically insulative column 27. The signal output bar 28 passes through the small-diameter hollow 26b, and an upper end of the signal output bar 28 is connected to the signal transportation cable (not shown) at the upper-end portion 21c of the main metal body 21. Provided at an end of a lower-end portion side of the signal output bar 28 is an electrode 29, which is made of a metal. A lower surface of the electrode 29 is arranged so as to come into contact with the pressure detection means 23 at a lower-end portion of the axial hollow 26. A lower end of the axial hollow 26, located in a cylinder, is a detection opening to be pressurized by the cylinder. In the detection opening, the pressure detection means 23 detects internal pressure of the cylinder. Further, the electrode 29 and the signal output bar 28 are in contact only with the electrically insulative column 27 in the axial hollow 26, and are electrically insulated from the main metal body 21.

The cap 24, mounted on the lower end of the main metal body 21, is pressed onto the lower end of the axial hollow 26 so as to cover the pressure detection means 23. The center of the cap 24 is provided with an opening whose diameter is smaller than that of the pressure detection means so that a lower surface of a central portion of the pressure detection means 23 is exposed even after the pressure detection means 23 is pressed onto the lower end of the axial hollow 26 with the cap 24. That is, a peripheral portion of the opening of the cap 24 press-fits the pressure detection means 23 into the main metal body 21. The cap 24 is screwed to the lower-end male screw 22b in the lower end of the main metal body 21 and keeps press-fitting the pressure detection means 23 into the main metal body 21.

In the following, the pressure detection means 23 will be described in detail with reference to FIG. 7.

The pressure detection means 23 is arranged so that: on a metal diaphragm (pressure transmission means) 10, a base layer 11, a piezoelectric thin film layer (piezoelectric element) 12, and an upper electrode 13 are laminated in this order.

Each of the films can be formed by a physical vapor deposition (PVD) process (which is a process by which a substance is evaporated by a physical method and concentrated on a member on which the substance is to be thinned so as to form a thin film). Examples of the PVD process are vacuum deposition processes (e.g., a resistance heating deposition or an electron beam heating deposition process), various sputtering processes (e.g., a DC sputtering process, a high-frequency sputtering process, an RF plasma support sputtering process, a magnetron sputtering process, an ERC sputtering process, and an ion beam sputtering process), various ion plating processes (e.g., a high-frequency ion plating process, an active deposition process, and an arc ion plating process), a molecular beam epitaxy process, a laser ablation process, an ion cluster beam deposition process, and an ion beam deposition process.

Figure 7:
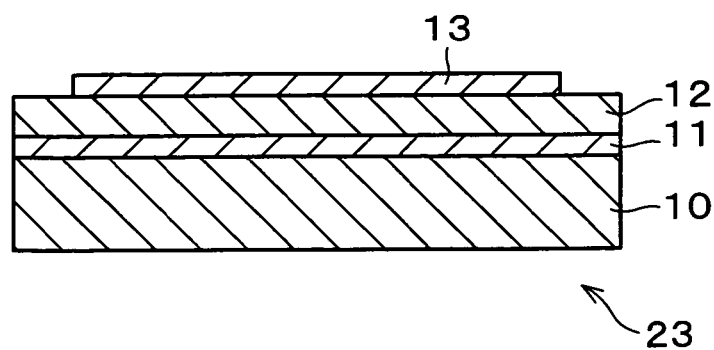
FIG. 7 is a cross-sectional view of a diaphragm of the piezoelectric sensor according to one embodiment of the present invention.

FIG. 7 is a cross-sectional view of the pressure detection means 23 according to the present embodiment. The pressure detection means 23 is arranged so that: on the metal diaphragm 10, the base layer 11, the piezoelectric thin film layer 12, and the upper electrode 13 are laminated in this order. When the pressure detection means 23 is mounted on the main body 21, the pressure detection means 23 is mounted on an opening in the lower end of the axial hollow 26 so that the upper electrode 13 is press-fitted onto the electrode 29.

The metal diaphragm 10 transmits pressure to the piezoelectric thin film layer 12 by coming into contact with a space where the pressure is measured, and serves as a substrate for supporting the pressure detection means 23. The metal diaphragm 10 is located in an internal-combustion cylinder which reaches a high temperature, so that the metal diaphragm needs to have heat resistance. It is preferable that the metal diaphragm 10 be made for example of a heat-resistant metal material equivalent to Inconel or SUS630. It is desirable that a surface on which the piezoelectric thin film layer 12 is formed be mirror-finished by a polishing or chemical method in order to prevent the piezoelectric thin film layer 12 from cracking and peeling and enhance an orientation of a crystal axis of the piezoelectric thin film layer 12.

Further, the base layer 11 is a buffer layer between the piezoelectric thin film layer 12 produced thereon and the metal diaphragm 10. The base layer 11 orients a polarity of the piezoelectric thin film layer 12, orients the crystal axis, and improves wettability of the piezoelectric thin film layer 12 with respect to the metal diaphragm 10. Further the base layer 11 is used also as a lower electrode.

The base layer 11 may be made of TiN, $MoSi_2$, $Si_3N_4$, Cr, Fe, Mg, Mo, Nb, Ta, Ti, Zn, Zr, W, Pt, Al, Ni, Cu, Pd, Rh, Ir, Ru, Au, or Ag, and may be constituted of a single layer, or two or more layers made of a plurality of materials.

The piezoelectric thin film layer 12 is subjected to pressure transmitted through the metal diaphragm 10 and the base layer 11 and outputs an electrical signal in accordance with the pressure. That is, a pressure under test is applied to the piezoelectric thin film layer 12 and converted by the piezoelectric thin film layer 12 into an electrical signal. It is desirable that the piezoelectric thin film layer 12 be made of aluminum nitride (AlN) or zinc oxide (ZnO) by a sputtering process.

The upper electrode 13, press-fitted onto the electrode 29 in the main metal body 21, transmits a charge, generated by an applied pressure, through the electrode 29 and the signal output bar 28 to the signal transportation cable (not shown). The upper electrode 13 may be made of the same materials as the base layer 11, but not necessarily. The upper electrode 13 may be made of a material appropriately chosen in accordance with its compatibility with the piezoelectric thin film layer 12 and the electrode 29, and may be constituted of a single layer.

In the following, an operation of the piezoelectric sensor will be described. The metal diaphragm 10 receives pressure and transmits the pressure to the piezoelectric thin film layer 12. The piezoelectric thin film layer 12 converts the pressure into an electrical signal. The electrical signal is transmitted to from the upper electrode 13 through the electrode 29 to the signal output bar 28 and further transmitted from the upper end of the main metal body 21 to the signal transportation signal, so that a pressure display section (not shown) displays a pressure under test.

Note that, a material for the piezoelectric thin film layer 12 is not limited to aluminum nitride (AlN) and zinc oxide (ZnO), but may be any piezoelectric material having no Curie point. GaN is an example. A crystal of such a piezoelectric material does not lose a piezoelectric property until the crystal is melted or sublimated. A crystal of a substance having a wurtzite structure has no symmetric property and therefore has a piezoelectric property. Further, the crystal is not a ferroelectric substance and therefore has no Curie point. Therefore, the piezoelectric sensor made of the piezoelectric material has an excellent durability, does not deteriorate in a piezoelectric property, and does not lose its function as a piezoelectric element even when exposed to a high temperature of 500° C. as in a cylinder of an engine. This makes it unnecessary to provide the piezoelectric element with cooling means or install the piezoelectric element in a low-temperature place, thereby simplifying the structure of the piezoelectric element.

Further, the piezoelectric sensor of the present invention includes the metal diaphragm 10 and a thin layer such as the piezoelectric thin film layer 12 formed thereon.

With this arrangement, the pressure detection means 23 has the metal diaphragm 10 and a thin layer such as the piezoelectric thin film layer 12 formed thereon, so that the pressure detection means 23 becomes thin and small. Moreover, the metal diaphragm used in this arrangement is different from the conventional arrangements, is used only for transmitting pressure to the piezoelectric element, and is subjected not to a deflection or strain but to a compressive strain. Therefore, the metal diaphragm is strained so slightly due to the pressure, and the piezoelectric element formed thereon is also so slightly strained, so that it is not necessary to provide a structure for preventing an excessive strain from damaging the piezoelectric element. This makes it possible to achieve an inexpensive piezoelectric element having a simple structure.

Further, it is desirable that the piezoelectric thin film layer 12 of the piezoelectric sensor of the present invention have a thickness of 0.1 µm to 100 µm. Further, it is more preferable that the piezoelectric thin film layer 12 have a thickness of 0.5 µm or more to 20 µm or less. It is even more preferable that the piezoelectric thin film layer 12 have a thickness of 1 µm or more to 10 µm or less. The piezoelectric thin film layer 12 with a thickness of less than 0.1 µm tends to short-circuit the base layer 11 and the upper electrode 13. The piezoelectric thin film layer 12 with a thickness of more than 100 µm takes longer time to form.

Further, in order to keep a good piezoelectric property, it is desirable that the piezoelectric thin film layer 12 have a dipole orientation degree of not less than 75%, more desirably, not less than 90%. This is because a dipole orientation degree of less than 75% causes an apparent piezoelectric constant to be not more than one half of that when a dipole orientation degree is 100%, and therefore causes a piezoelectric property of the piezoelectric thin film layer 12 to deteriorate, thereby making it impossible to detect pressure satisfactorily. A dipole orientation degree of not less than 75% ensures a sufficient piezoelectric property.

In order to ensure a dipole orientation degree of not less than 75%, it is necessary to cause a first atom to be easily orientable when a crystalline column deposits, and it is desirable that a material for the base layer 11 be a metal of the same component as a material for the piezoelectric thin film layer 12 (e.g., the base layer 11 be made of Al when the piezoelectric thin film layer 12 is made of AlN; the base layer 11 be made of Zn when the piezoelectric thin film layer 12 is made of ZnO). When the base layer 11 is formed of plural layers, it is desirable that a top layer (a layer which comes into contact with the piezoelectric thin film layer 12) be made of a metal of the same component as the piezoelectric thin film layer 12.

Further, in the present embodiment, the metal diaphragm 10 is used as pressure transmission means, but it is possible to provide a piezoelectric sensor having an excellent heat resistance and requiring no cooling means, even with a conventional arrangement in which pressure is transmitted from a metal diaphragm through another member, such as a pressure transmission bar, to a piezoelectric thin film layer.

Note that, the piezoelectric sensor of the present invention is applied for example to measuring internal pressure of an internal-combustion cylinder, but is not limited to this. The piezoelectric sensor of the present invention can be applied also to measuring a pressure fluctuation of a high-temperature, high-pressure fluid in a pipe and a tank in a plant such as an atomic power plant.

Note that, the present invention can be arranged also as the following piezoelectric sensor:

(i) A first piezoelectric sensor including a piezoelectric thin film element stored in an axial hollow provided in a main metal body, the main metal body being mounted on an internal-combustion cylinder, the axial hollow having a detection opening positioned in the cylinder, wherein:

the first piezoelectric sensor is constituted only of a metal diaphragm serving as pressure transmission means with respect to the piezoelectric thin film element.

(ii) The first piezoelectric sensor, wherein:

the piezoelectric thin film element is made of a piezoelectric thin film material having no Curie point and has a thickness of 0.1 µm to 0.1 mm.

(iii) The first piezoelectric sensor, wherein:

the piezoelectric thin film element is made of a thin film of aluminum nitride or zinc oxide.

(iv) The first piezoelectric sensor, wherein:

the piezoelectric thin film is made of a piezoelectric thin film of aluminum nitride having a dipole orientation degree of not less than 75%.

[Third Embodiment]

One embodiment of the present invention will be described below with reference to FIG. 8.

The piezoelectric sensor of the present invention is arranged so that: on a substrate 31, a base layer (first conductor film layer) 32, a piezoelectric thin film layer (piezoelectric element) 33, and an upper electrode (second conductor film layer) 34 are laminated in this order.

As with the Second Embodiment, each of the films can be formed by a physical vapor deposition (PVD) process.

Figure 8:
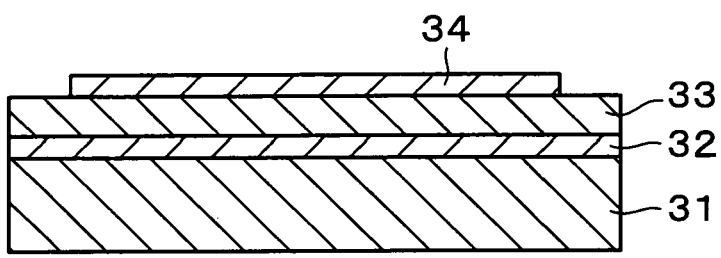
FIG. 8 is a cross-sectional view of a laminated substrate of the piezoelectric sensor according to one embodiment of the present invention.

FIG. 8 is a cross-sectional view of a thin-film piezoelectric sensor according to one embodiment of the present invention. The thin-film piezoelectric sensor is arranged so that: on the substrate 31, the base layer 32 serving also as a lower electrode, the piezoelectric thin film layer 33, and the upper electrode 34 are laminated in this order.

The piezoelectric sensor is used with a lower surface of the substrate 31 mounted on a target object. When an oscillation occurs in the target object, the oscillation is transmitted to the substrate 31. Whereas the substrate 31 oscillates together with the target object, a side of the piezoelectric sensor opposite to the target object oscillates with delay due to inertial force, and the piezoelectric thin film layer 33 is subjected to a compressive stress or tensile stress proportional to oscillatory acceleration. Further, a potential or a voltage proportional to the stress is generated on both sides of the piezoelectric thin film layer 33 and is extracted (taken out) by the base layer 32 and the upper electrode 34 provided on both sides of the piezoelectric thin film layer 33. A measurement of the electrical output so extracted makes it possible to detect a size of the oscillation or the acceleration of the target object.

The substrate 31, subjected directly to oscillation and pressure so as to generate a stress, can be constituted of an insulative or conductive substrate.

The insulative substrate is a substrate made of an oxide, carbide, nitride, or boride ceramic sintered body or quartz glass. Particularly, a substrate made of SiC (polycrystalline silicon carbide) is desirable. However, carbide ceramic substrates (e.g., substrates made of $B_4C$, TiC, WC, ZrC, NbC, and HfC), oxide ceramic substrates (e.g., substrates made of $AlO_3$, $ZrO_2$, $TiO_2$, and $SiO_2$), nitride ceramic substrates (e.g., substrates made of CBN, AlN, and TiN), and boride ceramic substrates (e.g., substrates made of $TiB_2$, $ZrB_2$, $CrB_2$, and MoB) can be used. These ceramic materials are expected to have an excellent heat resistance, be easy to produce, be inexpensive, have a high degree of hardness, and have high density.

It is desirable that the conductive substrate be made of a heat-resistant metal material equivalent for a example to Inconel or SUS630, and a surface thereof be mirror-finished by a polishing or chemical method in order to prevent the piezoelectric thin film layer 33 from cracking and peeling and enhance an orientation of a crystal axis of the piezoelectric thin film layer 33.

The base layer 32 is a buffer layer between the piezoelectric thin film layer 33 produced thereon and the substrate 31. The base layer 32 orients a polarity of the piezoelectric thin film layer 33, orients the crystal axis of the piezoelectric thin film layer 33, and improves wettability with respect to the substrate 31. The base layer 11 may be made of TiN, $MoSi_2$, $Si_3N_4$, Cr, Fe, Mg, Mo, Nb, Ta, Ti, Zn, Zr, W, Pt, Al, Ni, Cu, Pd, Rh, Ir, Ru, Au, or Ag, and may be constituted of a single layer or two or more layers made of a plurality of materials.

The piezoelectric thin film layer 33 is subjected to a stress generated by the substrate 31 to generate a charge or voltage in proportion to the stress.

A material for the piezoelectric thin film layer 33 is preferably aluminum nitride (AlN) or zinc oxide (ZnO), but is not limited to this, and only needs to be a piezoelectric material having no Curie point. The piezoelectric material having no Curie point does not lose a piezoelectric property until a crystal thereof is melted or sublimated. The piezoelectric material having no Curie point is for example a substance having a wurtzite structure, namely GaN as well as AlN and ZnO. Such a substance having a wurtzite structure has no symmetric property and therefore has a piezoelectric property. Further, the substance is not a ferroelectric substance and therefore has no Curie point. Therefore, the piezoelectric thin film layer 33 made of the piezoelectric material has an excellent durability, does not deteriorate in a piezoelectric property, and does not lose its function as a piezoelectric element even when exposed to a high temperature of 500° C. as in a cylinder of an engine. This makes it unnecessary to provide the piezoelectric thin film layer 33 with cooling means or install the piezoelectric thin film layer 33 in a low-temperature place, thereby simplifying the structure of the piezoelectric sensor.

Further, it is preferable that the piezoelectric thin film layer 33 has a dipole orientation degree of not less than 75%, more preferably, not less than 90%. This is because a dipole orientation degree of less than 75% causes an apparent piezoelectric constant to be not more than one half of that when a dipole orientation degree is 100%, and therefore causes a piezoelectric property of the piezoelectric thin film layer 12 to deteriorate, thereby making it impossible to detect pressure satisfactorily. A dipole orientation degree of not less than 75% ensures a sufficient piezoelectric property.

In order to ensure a dipole orientation degree of not less than 75%, it is necessary to cause a first atom to be easily orientable when a crystalline column deposits. Meanwhile, a piezoelectric material having no Curie point is different from a ferroelectric substance such as lead zirconate titanate and cannot be controlled by an external electric field after a crystal of the piezoelectric material has been formed. Therefore, in order to ensure that the piezoelectric thin film layer 33 has a dipole orientation degree of not less than 75%, a crystal of the piezoelectric thin film layer 33 needs to be controlled when the piezoelectric thin film layer 33 is formed so that a dipole orientation degree is not less than 75%. Specifically, when the piezoelectric thin film layer 33 is formed after the substrate 31 is provided with the base layer 32 for arranging a dipole orientation of a crystal of a piezoelectric layer, a dipole orientation degree of the piezoelectric thin film layer 33 can be turned up by setting an optimum substrate temperature, an optimum distance between targets, and an optimum gas pressure and arranging a c-axis orientation of the crystal. Thus, in order to improve a piezoelectric property, it is desirable to orient a crystal of a piezoelectric element in a c-axis direction.

Moreover, with an arrangement in which a side of the base layer 32 in contact with the piezoelectric thin film layer 33 is coated with a metal (Al, when the piezoelectric thin film layer 33 is made of AlN; Zn, when the piezoelectric thin film layer 33 is made of ZnO) contained in the piezoelectric thin film layer 33, a dipole orientation degree of the piezoelectric thin film layer 33 can be turned up even higher. At this time, when the base layer 32 is constituted of plural layers, it is desirable that a top layer (a layer which comes into contact with the piezoelectric thin film layer 33) be made of a metal contained in the piezoelectric thin film layer 33. Note that, a dipole orientation degree is defined as a percentage at which crystalline columns having the same polarity (positive or negative) occupy a surface of the piezoelectric thin film layer.

The upper electrode 34 detects a charge generated by an applied stress and can be made of the same material as the base layer 32, but not necessarily. The upper electrode 34 may be made of a material appropriately chosen in accordance with its compatibility with the piezoelectric thin film layer 33, and may be constituted of a single layer.

Further, it is desirable that the piezoelectric thin film layer 33 of the thin-film piezoelectric sensor of the present invention have a thickness of 0.1 µm to 100 µm. Further, it is more preferable that the piezoelectric thin film layer 33 have a thickness of 0.5 µm or more to 20 µm or less. It is even more preferable that the piezoelectric thin film layer 33 have a thickness of 1 µm or more to 10 µm or less. The piezoelectric thin film layer 33 with a thickness of less than 0.1 µm is prone to short-circuit the base layer 32 and the upper electrode 34. The piezoelectric thin film layer 33 with a thickness of more than 100 µm takes longer time to form.

Note that, the present invention can be arranged as the following thin-film piezoelectric sensors:

(i) A first high-temperature thin-film piezoelectric sensor having an insulative substrate with a metal electrode, a piezoelectric ceramic thin film, and a further metal electrode laminated in this order, the insulative substrate being made of an oxide, carbide, nitride, or boride ceramic sintered body or quartz glass, the piezoelectric ceramic thin film being made of a piezoelectric thin film material having no Curie point, the piezoelectric ceramic thin film having a dipole orientation degree of not less than 90%.

(ii) A second high-temperature thin-film piezoelectric sensor having a conductive substrate with a metal electrode, a piezoelectric ceramic thin film, and a further metal electrode laminated in this order, the conductive substrate being made of a heat-resistant metal material equivalent for example to Inconel or SUS630, the metal electrode serving as a buffer layer, the piezoelectric ceramic thin film being made of a piezoelectric thin film material having no Curie point, the piezoelectric ceramic thin film having a dipole orientation degree of not less than 90%.

(iii) The piezoelectric thin film sensor according to the first and second high-temperature thin-film piezoelectric sensors, wherein:
the piezoelectric thin film element is made of a piezoelectric thin film element with a thickness of 0.1 µm to 0.1 mm.

(iv) The piezoelectric thin film sensor according to the first and second high-temperature thin-film piezoelectric sensors, wherein:
the piezoelectric thin film element is made of a thin film of aluminum nitride or zinc oxide.

(v) The piezoelectric thin film sensor according to the first and second high-temperature thin-film piezoelectric sensors, wherein:
the piezoelectric thin film layer has a piezoelectric ceramic thin film and a metal electrode formed thereon, the metal electrode being divided into two or more.

EXAMPLE 2

An example of the piezoelectric sensor according to the Third Embodiment will be described below.

A base layer of a circular aluminum thin film with a diameter of 3 mm was formed by a sputtering process on a surface of a quartz glass substrate with a diameter of 17 mm and a thickness of 1 mm. Further on the base layer, a piezoelectric thin film layer of an AlN (aluminum nitride) thin film with a thickness of about 1 mm was produced by a sputtering process.

An analysis of an X-ray diffraction pattern showed that the AlN has an excellent crystalline property and is oriented in a c-axis direction. Further, a dipole orientation degree of a piezoelectric layer was 92%.

Next, a circular aluminum electrode, serving as an upper electrode, with a diameter of 3 mm was produced by a sputtering process on a surface of the AlN so as to overlap a lower electrode.

Figure 10:
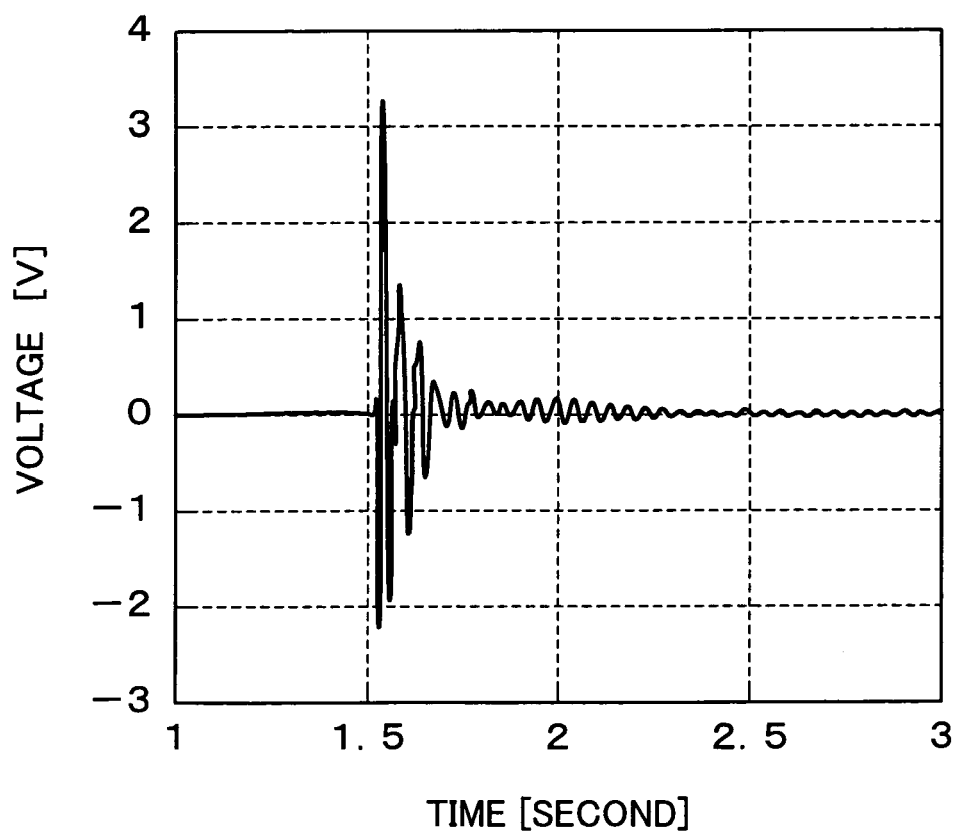
FIG. 10 is a graph showing a result of an oscillation detection measurement using a thin-film piezoelectric sensor according to one embodiment of the present invention.

FIG. 10 shows a result of an oscillation detection measurement by a compression-type thin-film piezoelectric sensor using the thin-film piezoelectric sensor. The horizontal axis represents time; the vertical axis represents a voltage of electricity generated. The measurement was carried out as follows. The thin-film piezoelectric sensor was fixed on a metal structure. The metal structure was given a shock by a hammer at a point of 1.51 seconds in the time of the horizontal axis. An oscillation generated by the shock was detected by the thin-film piezoelectric sensor. According to FIG. 10, the piezoelectric sensor generates a large voltage at a point of 1.519 seconds, i.e., at about the same time as the shock. This shows that the thin-film piezoelectric sensor generates the voltage in response to the oscillation. That is, the thin-film piezoelectric sensor has an appropriate piezoelectric property.

[Fourth Embodiment]

Figure 9:
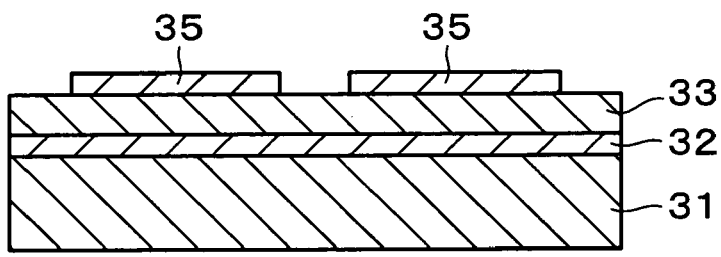
FIG. 9 is a cross-sectional view of a laminated substrate of a thin-film piezoelectric sensor, according to another embodiment of the present invention, having a plurality of divided upper electrodes formed thereon.

One embodiment of the present invention will be described below with reference to FIG. 9.

The thin-film piezoelectric sensor of the present invention is arranged so that: on the substrate 31, the base layer (first conductor film layer) 32, the piezoelectric thin film layer (piezoelectric element) 33, and a plurality of divided upper metal electrodes (second conductor film layer) 35 are laminated in this order.

Materials and producing methods of the substrate 31, the base layer 32, and the piezoelectric thin film layer 33 are the same as those in the Third Embodiment. However, the piezoelectric thin film layer 33 is provided with the divided metal electrodes 35, which are divided into two or more.

A material and producing method of the divided upper metal electrodes 35 is substantially the same as those in the Third Embodiment, except that the divided upper metal electrodes 35 are formed with a pattern mask and the like after the piezoelectric thin film layer is formed. That is, whereas the upper electrode 34 is formed as a monolithic layer in the Third Embodiment, the divided upper metal electrodes 35 divided into arbitrary shapes and numbers is produced in the Fourth Embodiment by placing an arbitrary pattern mask on a surface of the piezoelectric thin film layer 33 on the substrate 31.

With such an arrangement, when a stress varying from place to place is generated on a surface of the thin-film piezoelectric, the stress such as pressure varies depending on positions of the divided upper electrodes 35. This makes it possible to detect a difference between different charges and voltages generated on the divided upper electrodes 35. That is, it is possible to detect which part of the thin-film piezoelectric sensor is subjected to the stress.

Such a thin-film piezoelectric sensor can be used to detect an oscillatory direction by measuring a fluctuation in a temporal stress distribution. Further, in case of arranging a cantilever-type or a diaphragm-type thin-film piezoelectric sensor, it becomes possible to detect a difference with a hardware device by detecting a difference of the stress, thereby achieving high-sensitivity detection of a shear stress without restrictions placed on a dynamic range of an amplifier.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims. For example, also embodiments obtained by combining the technical means respectively disclosed in different embodiments are included in the technical scope of the present invention.

INDUSTRIAL APPLICABILITY

As described above, the piezoelectric sensor according to the present invention can be applied to a transparent piezoelectric sensor used in a transparent input device.

The piezoelectric sensor according to the present invention is arranged so as to include: a transparent piezoelectric element having a piezoelectric property; and a pair of transparent conductor film layers opposed to each other with the piezoelectric element therebetween, wherein the transparent piezoelectric element and the transparent conductor film layers are formed between a pair of transparent substrates opposite to each other.

The piezoelectric sensor of the present invention has a pair of transparent conductor films opposed to each other with a piezoelectric element interposed therebetween. Further, when one of the pair of substrates is subjected to outside pressure, the piezoelectric element takes a charge, and the charge is detected by the transparent conductor films, so that the outside pressure is detected. Therefore, the transparent conductor films do not need to come into contact with each other, thereby bringing about an effect of preventing a flaw from occurring due to contact. Moreover, the transparent conductor films do not need to be deformed, thereby bringing about an effect of providing a piezoelectric sensor having an excellent durability as compared with the conventional arrangements.

Such a piezoelectric sensor can be applied to an input device. In an input device having a plurality of the piezoelectric sensors of the present invention, i.e., a transparent input device having a plurality of the piezoelectric sensors of the present invention serving as a keypad, a pair of transparent conductor film layers of each of the piezoelectric sensors do not come into contact with each other, so that a flaw due to contact can be prevented and the piezoelectric sensor has an excellent durability. Therefore, the input device having the piezoelectric sensor of the present invention also brings about an effect of providing an input device having the same effect. Further, outside pressure is detected by the piezoelectric element, thereby bringing about an effect of detecting a position under pressure with a simple structure.

Further, the piezoelectric sensor of the present invention withstands high temperatures and therefore can be applied to a piezoelectric sensor used in an internal-combustion engine and an atomic power plant.

The piezoelectric sensor of the present invention has the piezoelectric element made of a piezoelectric material having no Curie point (such as a substance having a wurtzite structure), i.e., a dipole orientation film of aluminum nitride, zinc oxide, or a piezoelectric material having the same effect. Such a piezoelectric material does not deteriorate in a piezoelectric property even at high temperatures, so that the piezoelectric element does not need to be cooled by cooling means like the conventional arrangements. Further, it is no longer necessary to install the piezoelectric element in a low-temperature place, thereby eliminating the need for a pressure transmission bar and the like and bringing about an effect of simplifying the structure of the piezoelectric sensor.

Particularly, the piezoelectric sensor can be applied to a piezoelectric sensor having the pressure detection means stored in an axial hollow provided in a main metal body, the main metal body being mounted on an internal-combustion cylinder, the axial hollow having a detection opening positioned in the cylinder. In this case, the piezoelectric element has heat resistance, so that the structure of the piezoelectric element can be simplified effectively. Further, with a dipole orientation degree of not less than 75%, the piezoelectric element retains a piezoelectric property, and the piezoelectric sensor functions satisfactorily.

Further, when the piezoelectric sensor of the present invention is arranged so that the piezoelectric element is formed by a physical vapor deposition (PVD) process on a metal diaphragm to be press-fitted into the opening of the axial hollow in the main metal body, the diaphragm and the piezoelectric element become very thin, so that the pressure detection means becomes thin and small. Further, the metal diaphragm and the piezoelectric element strained so slightly, thereby eliminating the need for an arrangement for preventing a strain. This brings about an effect of extremely simplifying the structure of the piezoelectric sensor having heat resistance.

Further, the thin-film piezoelectric sensor of the present invention can be used as a thin-film piezoelectric sensor having a substrate with a first conductor film layer, a piezoelectric element, and a second conductor film layer laminated on a surface thereof in this order.

With the foregoing arrangement, a small, inexpensive thin-film piezoelectric sensor for detecting acoustic emission and oscillation or acceleration in an engine and an atomic power plant can be provided which ensures a piezoelectric property, requires no cooling means, and has an excellent durability.

The piezoelectric sensor of the arrangements described above brings about an effect of providing a market with a small, inexpensive piezoelectric sensor having an excellent heat resistance and durability.

The invention claimed is:

1. A piezoelectric sensor, comprising pressure detection means which includes:
    pressure transmission means for transmitting pressure; and
    a piezoelectric element for receiving the pressure so as to convert the pressure into an electrical signal, the pressure being transmitted from the pressure transmission means, said piezoelectric sensor being characterized in that
    said piezoelectric element is made of a piezoelectric material having no Curie point and has a dipole orientation degree of not less than 75%.

2. The piezoelectric sensor according to claim 1, wherein said piezoelectric element is made of a substance having a wurtzite structure.

3. The piezoelectric sensor according to claim 2, wherein said piezoelectric element is made of aluminum nitride or zinc oxide.

4. The piezoelectric sensor according to claim 1, wherein said piezoelectric element is formed by a physical vapor deposition process.

5. The piezoelectric sensor according claim 1, wherein said piezoelectric element has a thickness of 0.1 μm or more to 100 μm or less.

6. The piezoelectric sensor according to claim 1, wherein: said pressure transmission means is constituted of a metal diaphragm, and said pressure detection means is formed by providing a piezoelectric element on a surface of the metal diaphragm.

7. The piezoelectric sensor according claim 1, further comprising a main metal body for mounting said pressure detection means on an internal-combustion cylinder, the main metal body having an axial hollow for connecting an inside of the cylinder with an outside of the cylinder, said pressure detection means being provided in the axial hollow.

8. The piezoelectric sensor according to claim 1, wherein:
said pressure transmission means is a substrate, and
a first conductor film layer, said piezoelectric element, and a second conductor film layer are laminated on a surface of the pressure transmission means in this order.

9. The piezoelectric sensor according to claim 8, wherein said substrate is an insulative substrate made of an oxide, carbide, nitride, or boride ceramic sintered body or quartz glass.

10. The piezoelectric sensor according to claim 8, wherein said substrate is a conductive substrate made of a heat-resistant metal material.

11. The piezoelectric sensor according to claim 8, wherein said first conductor film layer has a surface, being in contact with the piezoelectric sensor, which is coated with a metal contained in the piezoelectric sensor.

12. The piezoelectric sensor according to claim 8, wherein said second conductor film layer is divided into two or more.

13. A method of producing the piezoelectric sensor of claim 1, comprising the steps of:
forming transparent conductor film layers respectively on a pair of transparent substrates;
forming a transparent piezoelectric element having a piezoelectric property so as to cover one of the transparent conductor film layers which has been formed on one of the pair of transparent substrates; and
bonding the piezoelectric element to the other of the transparent conductor film layers which has been formed on the other transparent substrate not provided with the piezoelectric element.

* * * * *